United States Patent
Ankory et al.

(10) Patent No.: US 8,005,656 B1
(45) Date of Patent: Aug. 23, 2011

(54) APPARATUS AND METHOD FOR EVALUATION OF DESIGN

(76) Inventors: Ran Ankory, London (GB); Maya Carni, London (GB)

( * ) Notice: Subject to any disclaimer, the term of this patent is extended or adjusted under 35 U.S.C. 154(b) by 0 days.

(21) Appl. No.: 12/292,520

(22) Filed: Nov. 20, 2008

Related U.S. Application Data

(60) Provisional application No. 61/006,928, filed on Feb. 6, 2008.

(51) Int. Cl.
*G06F 9/455* (2006.01)
(52) U.S. Cl. ............... 703/6; 382/103; 702/182
(58) Field of Classification Search ............... 703/6, 13, 703/22; 482/4; 382/103; 704/270; 340/539.12; 348/143; 715/700, 744; 700/94, 276; 434/262; 345/419; 379/202.01; 455/414.3; 381/61; 702/182; 705/7, 35, 401; 463/37; 706/47; 707/104.1

See application file for complete search history.

(56) References Cited

U.S. PATENT DOCUMENTS

| | | | | |
|---|---|---|---|---|
| 2002/0029129 A1* | 3/2002 | Satoh et al. | .................... | 702/182 |
| 2004/0015424 A1* | 1/2004 | Cash et al. | ...................... | 705/35 |
| 2004/0117325 A1* | 6/2004 | Cash et al. | .................... | 705/401 |
| 2005/0261886 A1* | 11/2005 | Kagarlis | .......................... | 703/22 |
| 2006/0223635 A1* | 10/2006 | Rosenberg | ....................... | 463/37 |
| 2006/0277466 A1* | 12/2006 | Anderson | ....................... | 715/700 |
| 2007/0022384 A1* | 1/2007 | Abbott et al. | .................. | 715/744 |
| 2007/0250361 A1* | 10/2007 | Hazy | ................................ | 705/7 |
| 2007/0273504 A1* | 11/2007 | Tran | ......................... | 340/539.12 |
| 2008/0020361 A1* | 1/2008 | Kron et al. | ..................... | 434/262 |
| 2008/0120113 A1* | 5/2008 | Loyall et al. | ................... | 704/270 |
| 2008/0144794 A1* | 6/2008 | Gardner | .................... | 379/202.01 |
| 2008/0215172 A1* | 9/2008 | Digon | .............................. | 700/94 |
| 2008/0249756 A1* | 10/2008 | Chaisuparasmikul | .......... | 703/13 |
| 2008/0281472 A1* | 11/2008 | Podgorny et al. | ............. | 700/276 |
| 2009/0010493 A1* | 1/2009 | Gornick et al. | ................ | 382/103 |
| 2009/0023554 A1* | 1/2009 | Shim | ................................ | 482/4 |
| 2009/0029687 A1* | 1/2009 | Ramer et al. | ................ | 455/414.3 |
| 2009/0051686 A1* | 2/2009 | Legaut et al. | .................. | 345/419 |
| 2009/0100354 A1* | 4/2009 | Jung et al. | ....................... | 715/757 |
| 2009/0102919 A1* | 4/2009 | Zamierowski et al. | ........ | 348/143 |
| 2009/0210373 A1* | 8/2009 | Yu et al. | .......................... | 706/47 |
| 2009/0259685 A1* | 10/2009 | Agrawal et al. | ............ | 707/104.1 |
| 2009/0285407 A1* | 11/2009 | Cragun | ............................ | 381/61 |

* cited by examiner

*Primary Examiner* — Kandasamy Thangavelu

(57) ABSTRACT

A method of evaluating a design model, including:
providing a design model;
simulating a behavior of at least one digital user in said model;
simulating at least one environmental effect modulated by said model and affecting or affected by at least one of said at least one digital user; and
evaluating said design model based on a result of said simulations.

40 Claims, 21 Drawing Sheets
(3 of 21 Drawing Sheet(s) Filed in Color)

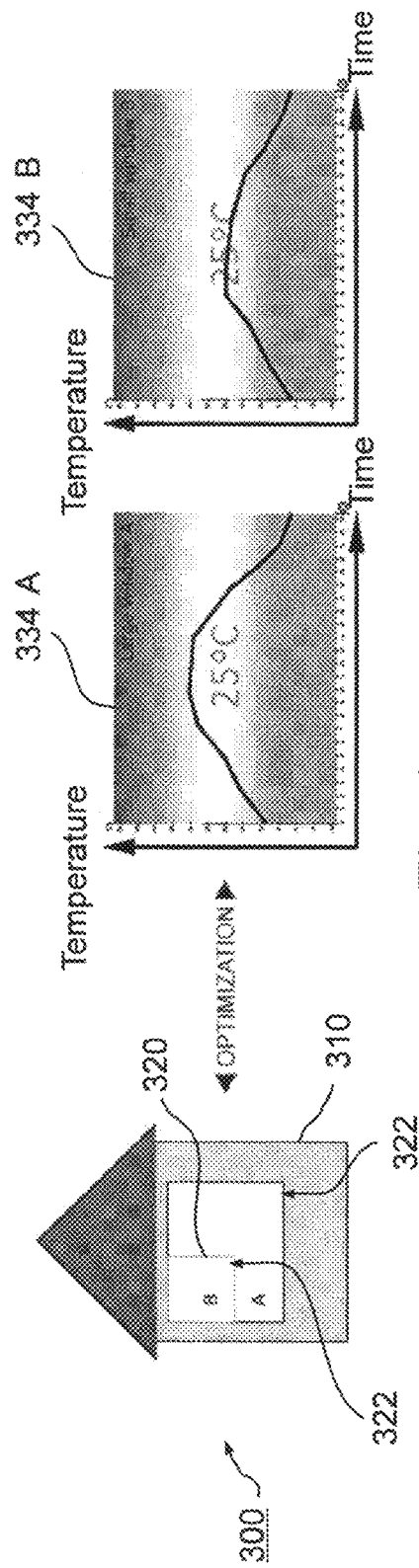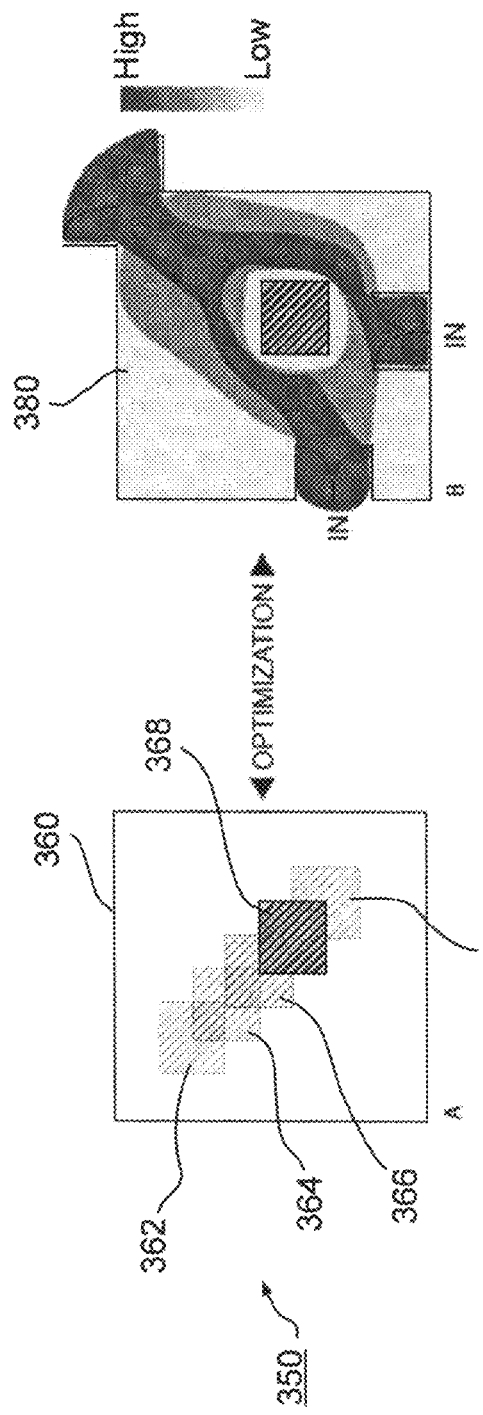
Fig. 3a
Fig. 3b

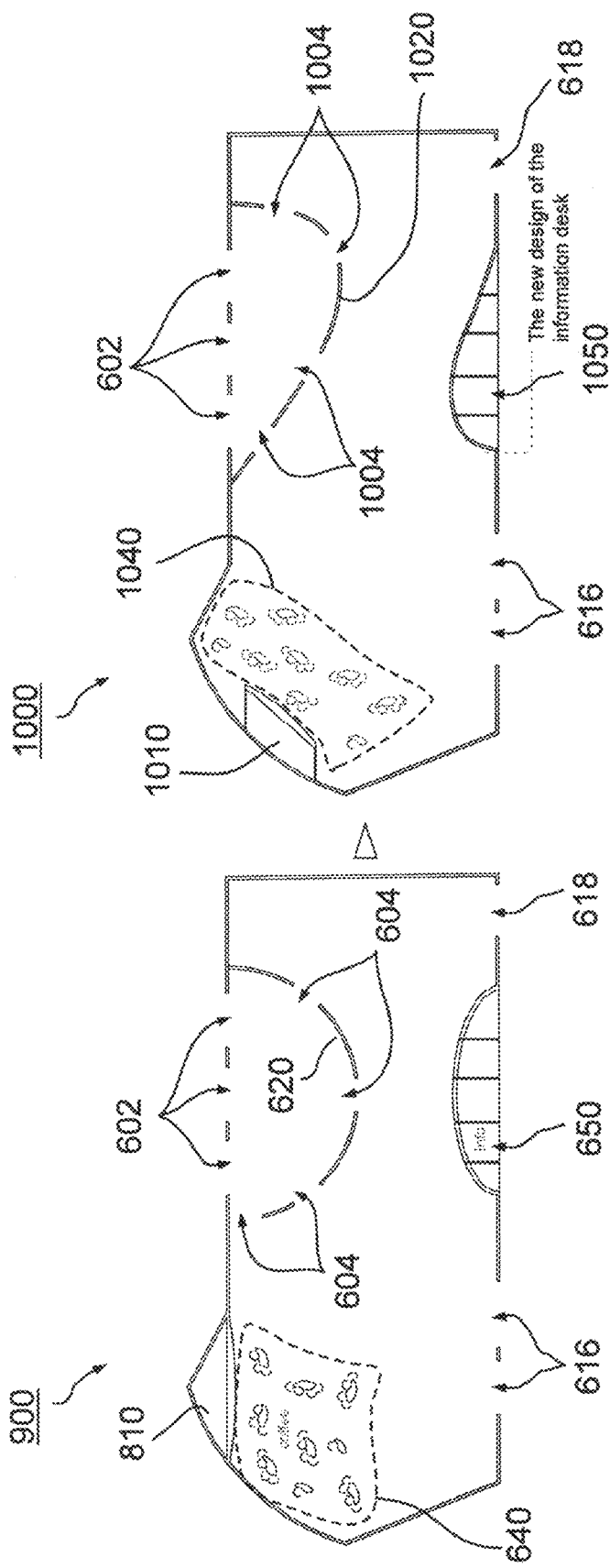

APPARATUS AND METHOD FOR EVALUATION OF DESIGN

RELATED APPLICATION

This application claims the benefit under 35 USC 119(e) of a provisional application with same title and same inventors, filed on Feb. 6, 2008 and having Ser. No. 61/006,928, the disclosure of which is incorporated herein by reference.

FIELD AND BACKGROUND OF THE INVENTION

The present invention, in some embodiments thereof, relates generally to evaluation, whether manual or computerized, of designs (e.g. architectural designs) for example to evaluation of design space with regards to environmental and/or ergonomic parameters during simulated use.

In general, an Architectural design process comprises three phases, each phase comprising several steps.

In phase 1 an initial response to the design brief and site conditions is prepared as a set of models and/or drawings and/or diagrams providing optional design(s) for discussion with clients.

Table 1 (below) summarizes exemplary commercially available tools for different phases of the design process and their nominal functions.

In phase 2, development of a selected design proceeds to submission of planning permission after which, production of detailed drawings, material selection and specifications, are produced in conjunction with consultations with relevant professionals (structural, environmental, M&E engineers) and design iterations.

In phase 3 final details are resolved in drawings, approval by engineers is sought and tender documents for construction are produced.

TABLE 1 exemplary tools for different phases of design process and their nominal functions.

| Phase | Nominal Function | Application Name | Company |
|---|---|---|---|
| 1, 2, 3* at each stage used to perform the relevant tasks | Lists Text documents Tables, Graphs Spreadsheets 2D drawing, graphs, diagrams, layouts. 2D/3D drafting, 3D modeling Renderings Animations | Microsoft Word<br><br>Microsoft Excel<br><br>Adobe Illustrator<br><br><br>AutoCAD Maya 3D Studio Max | Microsoft Reading Berkshire UK<br><br><br><br>Adobe Systems Incorporated San Jose, CA, U.S.A<br><br>AutoDesk, Inc. San Rafael, CA, USA |
| 2, 3 | Thermal, sun/shade Lighting levels Winds. analysis | Ecotect | Square One research Pty Ltd Joondalup, Australia |
|  | Air flow Analysis Structural Analysis General CFD | Ansys | ANSYS Canada Ltd. Waterloo, Canada |
|  | Acoustic analysis | CATT-Acoustic | CATT Gothenburg, SWEDEN |

Artificial Intelligence engines are commercially available (e.g. "ILOG" from ILOG inc.; Sunnyvale Calif., USA and/or "BLAZE" from Fair Isaac Co.; Minneapolis Minn., USA).

Building Design Advisor (BDA; U.S. Department of Energy's Lawrence Berkeley National Laboratory; Berkeley Calif., USA) provides representations of day lighting, electrical lighting and energy analysis. Similar representations are provided by commercial products such as IES (http://wwwDOTiesveDOTcom) and Ecotect (http://ecotectDOTcom/home).

DI-GUY (Boston Dynamics, Cambridge Mass., USA) is a military animation engine, limited to military scenarios. DI-Guy includes no modeling tools and relies upon an external terrain modeling application. DI-Guy can be used for visualization or animation of a pre planned set of actions. The behavior of each digital soldier during the animation is tightly scripted by the user for specific actions and predefined routes or controlled using a joystick.

SUMMARY OF THE INVENTION

A broad aspect of some embodiments of the invention relates to facilitating cooperation between different professional activities during planning of a building, room or other design space. In an exemplary embodiment of the invention, the professionals include design professionals (e.g. architects) and construction/environmental professionals (e.g. engineers). In an exemplary embodiment of the invention, an architect oversees the design process while contributing to the cooperation. Optionally, one or more design professionals view a simulation presented as a graphic animation sequence depicting a population of simulated users engaged in activities within the design space. In an exemplary embodiment of the invention, the activities are carried out by different professionals. In other embodiments of the invention, the activities are carried out by a same professional on a same station, in a same software application and without changing one or more, optionally all of location, program and/or interface. Optionally, the workflow of the professional is changed, in that a professional can receive input on the consequences of a design earlier in a project, possibly in an interactive manner with design, possibly as the design is being changed, or at least, in some embodiments, within 1 day, 1 hour, 20 minutes, 5 minutes or intermediate times.

An aspect of some embodiments of the invention relates to integrated and interactive design analysis which combines at least two of architectural model (e.g., visual), user (e.g., simulated users) interaction with the model and environmental considerations. In an exemplary embodiment of the invention, the analysis comprises interactively changing one of the three and seeing the effect on one or two of the others. For example, an architectural model may be modified yielding change sin user activity and temperature distribution in the model. Conversely, changes in angle of sunlight can drive changes in suggested location/size of windows and changes in patterns of user movements. In an exemplary embodiment of the invention, interactive manner comprises presenting an operator with a single interface allowing modification of desired parameters in any of the above three considerations and seeing an immediate effect on other(s) of the three. In some cases, the effects are negative (e.g., increases user transit time), and in others, the effects are positive (e.g., greater usability of structure). In some embodiments, the effects are used to drive automatic placement/sizing/other properties (e.g., location, orientation, opacity, reflectivity, acoustic properties, such as absorption within a range of given values, and shape) of architectural items. In an exemplary embodiment of the invention, the effects cause chain reactions of changes in the design, for example, causing the changes in parameters of a plurality of objects (e.g., in series or in parallel).

An aspect of some embodiments of the invention relates to automatic variation and optionally optimization of an architectural design, responsive to a simulated usage of the design. In an exemplary embodiment of the invention, the simulated usage includes one or both of user simulation and environmental simulation. In an exemplary embodiment of the invention, the variation comprises one or more of moving of one or more objects, changing object size(s), changing object visual property(s) and/or changing visibility of object(s). In an exemplary embodiment of the invention, automatic variation comprises simulating a usage of the design and changing the design responsive to results of the simulation.

An aspect of some embodiments of the invention relates to a single user interface adapted to receive design inputs pertaining to a variety of professions and to provide output indicative of the effect of these design inputs on a group of simulated users in a model space. Optionally, the simulated users are programmed to pursue goals. Optionally, the professions include, but are not limited to, architect, structural engineer (e.g. civil engineer), mechanical engineer, electrical engineer, environmental engineer (e.g. heating/cooling specialist and/or acoustic engineer), safety compliance specialist (e.g. fire safety engineer), and efficiency expert.

According to some aspects of the invention, there is provided a computerized user interface which provides output in the form of impact on one or more simulated users in response to physical design inputs. Optionally, the impact is ergonomic impact. The phrase "ergonomic impact" as used herein includes, but is not limited to, impact on occupancy density, internal gain, performance and velocities of users. Internal gain as used in this specification and the accompanying claims includes, but is not limited to, heat produced or dissipated by various sources (e.g. occupants, appliances and lighting) in a model space. In some embodiments of the invention, the concept of internal gain is applied to non-thermal parameters such as humidity, $CO_2$ A) $O_2$ concentration, noise level or lighting level.

In an exemplary embodiment of the invention, the output relates to a population of simulated users using the physical design. In an exemplary embodiment of the invention, the population of simulated users is divided into sub-populations. In an exemplary embodiment of the invention, the population and/or sub-populations thereof are programmed to pursue goals within a spatial model based on the design inputs. Optionally, the goals of a user can change, for example, according to circumstances (e.g., design, users and/or environment considerations). Optionally or alternatively, to changing goals, a relative priority of goals may change. Optionally, a goal may be created according to an occupancy of a delineated area of the model by a simulated user.

In an exemplary embodiment of the invention, the digital simulated users are not simulated at an ergonomic level, rather, the highest resolution used is that of body volume and/or viewing area. In an exemplary embodiment of the invention, using a more abstract modeling of a digital user reduces the computational complexity, while providing substantially all useful architectural information.

In some embodiments, ergonomic considerations are used, possibly to the level of limb movement clearance and/or finger usage and/or joint ranges and angles. Optionally, the simulation assumes various comfortable configurations of a user, such as sitting (e.g., a digital user may sit longer at a comfortably sized bench or stone). In an exemplary embodiment of the invention, a simulation includes three factors, ergonomics of interaction of user with design and/or other users, environmental interaction of user with design and/or other users and predefined behaviors of the digital user to interact with design and/or other users. In an exemplary embodiment of the invention, various combinations of these three considerations are explored by modifying one or more and determining an effect on others and/or on a usability score of a design.

In an exemplary embodiment of the invention, a design is scored as to its usability, for example, based on average waiting time in queue, money spent in stores, time to get to a train, variability of delays, a general "comfort" score which is a function of environmental conditions and/or visual crowding, a measure of time spent looking for signs or a target of a goal and/or any other statistical or mathematical function of the behavior of digital users. Optionally, a plurality of score functions is predefined and available for selection, optionally with the ability to change a parameter thereof. Optionally or alternatively, a user can define a new function, for example, using a mathematical language or a programming language.

In an exemplary embodiment of the invention, the score is shown in real-time as it is generated. Optionally, the score is shown as a function of time and/or simulation parameters (e.g., number of users, time of day). Optionally, a score is shown per digital user, set of users and/or a design.

In an exemplary embodiment of the invention, different scores are shown for different designs. Optionally, a user can suggest a range of values for one or more parameters of a design. Optionally, a score is shown for each parameter value. Optionally or alternatively, a user is shown a score for different automatically selected variables. Optionally, a user can see scores side by side for a plurality of different designs, defined by the range method, being different designs or automatically generated, and/or other ways of indicating designs.

In an exemplary embodiment of the invention, non-emergency scenarios are evaluated. Typically, in a non-emergency scenario, a plurality of different scenarios is tested, rather than only one, as emergency scenario testing is typically used for confirmation of a design. In an exemplary embodiment of the invention, however, a plurality of designs may be tested in order to assist in designing a design useful for one or more emergency situations. Optionally, and unlike emergency testing, also non-emergency scenarios are tested on a design at a same time (e.g., session, day). Optionally or alternatively, and unlike typical emergency scenarios, at least some, and typically most, of the digital users have non-emergency goals and/or have goals which override emergency settings. Typical emergency goals include "reach the nearest entrance as fast as possible" and "leave building as fast as possible". A typical non-emergency goal includes the performance of one or more time consuming (e.g., more than 1-5 minutes) activities before leaving the building and/or attempting to do so. In an exemplary embodiment of the invention, a score of a design includes also comfort and/or visual interest.

In an exemplary embodiment of the invention, a non-emergency scenario is one which is expected to be periodically acted out in a realized design, for example, at least once a day (e.g., putting aside time settings of the scenario, such as date), once a week or once a month. In some cases, the scenario is acted out at least 10 times a day by different actors at different times of the day. This is in contrast to emergency scenarios, which are typically acted out only once in a few years, or possibly once every few months or a year, during training.

According to some aspects of the invention, there is provided a computerized user interface which provides output in the form of environmental impact (e.g. temperature and/or humidity and/or airflow and/or noise levels and/or lighting levels and/or direct sun/shade) on one or more simulated users in response to physical design inputs.

In an exemplary embodiment of the invention, the environmental impact influences a population of and/or groups of simulated users programmed to pursue goals within a spatial model based on the design inputs. Optionally, the environmental output data is presented graphically via figures representing the population of simulated individuals moving through a design space. For example, if a temperature of 20 degrees centigrade is desired, simulated individuals moving through a design space might be depicted as grey at 20 degrees and turn pink to red as they encounter progressively higher temperatures and/or turn light blue to dark blue as they encounter progressively lower temperatures.

In an exemplary embodiment of the invention, the output is presented as bubbles and/or zones.

Optionally, the zones are defined in terms of a level of attractiveness to simulated users, for example due to certain environmental and/or visual (e.g., with respect to functional usage, such as sign seeing and queue seeing) properties of the zone.

Optionally, bubbles represent a space needed for the performance of a certain activity. In an exemplary embodiment of the invention, a bubble can be created by defining an object which is the sum of all the space occupied by digital users performing the activity during a simulation.

Both zones and bubbles are optionally defined graphically in volumetric terms.

In an exemplary embodiment of the invention, individuals in a simulated population are attracted to and/or repelled by defined environmental conditions including one or more of temperature and/or humidity and/or airflow and/or noise level and/or lighting level and/or direct sun, and/or shadow areas and/or glare conditions. Optionally, the individuals are programmed to tolerate a repellant environmental condition for a brief period of time before moving away from the repellant environmental condition. In an exemplary embodiment of the invention, the individuals are programmed to pursue a programmed activity even in the face of repellant environmental conditions.

According to some aspects of the invention, there is provided a computerized user interface which offers simulated and/or pseudo random behavior of groups of users in a physical design space. In an exemplary embodiment of the invention, the pseudo random behavior is of a population of simulated users programmed to pursue goals within a spatial model. Typically, the pseudo random behavior is limited by normal variation in performance of the programmed pursuit of goals. In an exemplary embodiment of the invention, the spatial model includes a plurality of design inputs. In an exemplary embodiment of the invention, the user interface is adapted to accept changes in one or more design inputs and show how the changes influence the simulated behavior of the population pursuing goals within the spatial model. Optionally, interaction of individuals with one another contributes to the randomness of behavior of the population. In an exemplary embodiment of the invention, design inputs are manipulated to achieve desired architectural goals as indicated by the simulated behavior of the population. Optionally, manipulation of design inputs can influence complex group behaviors such as queue formation, queue identification, queue selection, and line waiting (e.g. passengers passing through a bank of turnstiles at a transportation terminal).

In some exemplary embodiments of the invention, the user interface includes multiple input modules, each input module tailored for use by one or more professions.

In other exemplary embodiments of the invention, a single user manipulates parameters traditionally associated with multiple areas of specialty expertise. Optionally, this capability makes an early stage design more likely to comply with later demands of one or more professions. Traditionally, high costs and/or coordination problems of professional consultancy/analysis pushed consideration of these issues to a later stage of the design process. As a result, environmental solutions (e.g. heating cooling and/or acoustic) have often been provided as last stage additions which precluded major re-design.

In an exemplary embodiment of the invention, the user interface contributes to improved communication among diverse professions and/or allows designers to anticipate issues likely to be raised by diverse professionals.

In an exemplary embodiment of the invention, the interface shows an effect of a change in design input interactively, optionally substantially immediately.

In some exemplary embodiments of the invention, the effect of the change in design input is visible as an impact on a population of simulated user. Optionally, the impact is seen in a current or in a subsequent simulation scenario.

In some exemplary embodiments of the invention, the effect of the change in design input is visible as an impact on size and/or shape and/or parameters of bubbles or zones. Optionally, a change in a design input produces a substantially immediate change in a graphically represented bubble or zone.

According to various exemplary embodiments of the invention, a modeled design space is characterized by an area of 50, 100, 200, 500, 1000, 10,000, 20,000 or 50,000 square meters or lesser or intermediate or greater areas. For example, the analyzed area/design can be a room, a set of rooms, a living unit, a public space, a public building or part thereof, a set of buildings, a city block or larger units, for example, including streets (optionally with simulation of vehicles). Optionally, a large area is analyzed as several smaller component areas. Optionally, an analyzed design space can include interior and/or exterior spaces so that principles of the invention can be applied to architecture and/or landscape architecture and/or city planning projects. In an exemplary embodiment of the invention, the design includes at least 3, 4, 5, 6 or more rooms with passageways between them. In an exemplary embodiment of the invention, the design includes at least 1, 2, 3, 4, 5, or more movable objects with which users interact. In an exemplary embodiment of the invention, the design includes at least 1, 2, 3, 4, 5, or more non-movable objects with which users interact.

Exemplary embodiments of the invention employ innate decision making capabilities of AI engines to simulate architectural occupancy and/or use scenarios.

An aspect of some embodiments of the invention relates to simulated digital users that navigate via signs. Optionally, a user uses two or more signs in sequence to arrive at a programmed destination. A sequence of signs can be either similar or different. For example a first sign might say "Exits level 2" and additional signs on level 2 might indicate "Fourth Avenue" and "Fifth Avenue".

In some exemplary embodiments of the invention, an effect of a change in an input produces a substantially immediate change in a graphically represented object in the model. Optionally, the input can be an environmental and/or occupancy parameter (e.g. desired temperature, density, average speed). Optionally, the change in the graphically represented object can be a change in size and/or shape and/or orientation and/or location of objects in the model (e.g. size/shape of window, location of column). In an exemplary embodiment of the invention, a user experiments with one or more design parameters until a satisfactory output is achieved. Optionally, the output considers impact on a population of simulated users within the model. Optionally, a user can provide a range of possible values for various parameters, for example, reflectance, acoustic absorption, color and thermal density. Optionally, the range is provided as a set of possible discrete values, possible with a material definition (of which several options may be allowed by the user) lining together a set of different physical properties. Some objects may be active objects, for example, light sources, heat sources, white noise sources (e.g., fountains to mask conversation), music sources (e.g., speakers), cooling sources, air flow sources (e.g., for fresh air environmental properties), whose properties may be selected, optionally automatically, to meet various requirements. In an exemplary embodiment of the invention, an object has a behavior associated with it, for example, as a script or state machine, which defines an output or behavior of the object as a function, for example, of time, input and/or environmental conditions. For example, a ticket machine may be preset to breakdown after 10 minutes or 1000 users. A fire may be set to increase in heat and size every 1 minute, unless prayed with water and/or a function of number and duration of applied sprays.

Various exemplary embodiments of the invention are expected to find utility in applications including, but not limited to:

Security (e.g. simulating security related scenarios, planning of vehicular and pedestrian patrol strategies, locations of guards and visibility issues);

Advertising (e.g. simulating visibility of displayed goods and/or signs);

Traffic control (e.g. simulating traffic related scenarios using roundabouts and/or traffic lights and/or traffic signs); and Event planning (e.g. simulating placement of objects (e.g. tables, booths) within an established space for an event).

In some embodiments, the design space is degenerate and may consist, for example, of a plane, with a plurality of simulated users traversing the plane according to their setup. In some embodiments, the space includes at least some 3D elements that interact with simulated user.

There is provided in accordance with an exemplary embodiment of the invention, a method of evaluating a design model, comprising:

providing a design model;

simulating a behavior of at least one digital user in said model;

simulating at least one environmental effect modulated by said model and affecting or affected by at least one of said at least one digital user; and evaluating said design model based on a result of said simulations.

In an exemplary embodiment of the invention, said at least one digital users comprises a plurality of digital users.

There is provided in accordance with an exemplary embodiment of the invention, a said simulating is performed with a same software/hardware system as used for editing said model.

There is provided in accordance with an exemplary embodiment of the invention, a said evaluating comprises interactive evaluation during modification of said design model. Optionally, said interactive evaluation comprises continuously changing at least one property of an object of said model. Optionally, said object is an architectural object. Optionally or alternatively, said object represents an object movable in the real world.

In an exemplary embodiment of the invention, said interactive evaluation comprises showing an effect of said modification at least every 25 seconds.

In an exemplary embodiment of the invention, simulating at least one digital user comprises simulating at least 10 digital users.

In an exemplary embodiment of the invention, simulating at least one digital user comprises simulating at least 100 digital users.

In an exemplary embodiment of the invention, simulating at least one digital user comprises simulating a non-emergency scenario for said at least one user.

In an exemplary embodiment of the invention, simulating at least one digital user comprises simulating a queuing behavior of at least one of said at least one user.

In an exemplary embodiment of the invention, simulating at least one digital user comprises changing at least one of a goal and a goal priority of a user during said simulating.

In an exemplary embodiment of the invention, evaluating comprises showing an indication of presence of a digital user.

In an exemplary embodiment of the invention, said indication comprises one or both of a track and a bubble of movement of said at least one user.

In an exemplary embodiment of the invention, evaluating comprises graphically showing statistics of said users coded, per user, by a primary task of a user.

In an exemplary embodiment of the invention, said environmental effect comprises an effect from outside of said model.

In an exemplary embodiment of the invention, said environmental effect comprises an effect from inside of the model. Optionally, said inside effect comprises one or more of internal gains, artificial lighting and heating and cooling.

In an exemplary embodiment of the invention, said environmental effect comprises one or more of sunlight, temperature, noise, humidity, wind and daylight.

In an exemplary embodiment of the invention, said environmental effect is affected by said at least one user.

In an exemplary embodiment of the invention, said at least one user acts different when affected by said environmental effect In an exemplary embodiment of the invention, said simulations include a cascade effect caused by interaction between at least two of said model, said at least one user and said environmental effect.

In an exemplary embodiment of the invention, said evaluating comprises automatically changing said design in response to said simulations.

In an exemplary embodiment of the invention, said simulatings are performed as a single simulation.

There is provided in accordance with an exemplary embodiment of the invention, apparatus for model evaluation, embodied in a device, comprising:

a model editing module configured for creating and editing a design model;

a digital user simulation model adapted to simulate the interaction of at least one user with said model; and an environmental simulation module adapted to simulate the effect of an environment, with which said model and said at least one user can interact; and an output module configured to generate an output.

In an exemplary embodiment of the invention, the apparatus comprises a database storing therein model properties including environmental interaction properties and spatial properties.

There is provided in accordance with an exemplary embodiment of the invention, a method of evaluating a model design, comprising:

providing a model design;

simulating an interaction of said design with at least one of a user simulation and an environmental simulation; and immediate utilization of said simulation to modify said design.

In an exemplary embodiment of the invention, said immediate utilization comprises manual manipulation of said model during said simulation.

In an exemplary embodiment of the invention, said immediate utilization comprises automatic manipulation of said model during said simulation.

In an exemplary embodiment of the invention, said simulating comprises simulating the interaction between a user and an environmental effect.

There is provided in accordance with an exemplary embodiment of the invention, apparatus for model evaluation, embodied in a device, comprising:

a model editing module configured for storing and editing a design model; and a simulation module configured to simulate one or both of at least one digital user and an environmental effect;

wherein said model editing module is configured to modify said model during said simulation.

In an exemplary embodiment of the invention, the apparatus comprises a design module configured to automatically modify said design in response to said simulation.

There is provided in accordance with an exemplary embodiment of the invention, a method of evaluating a model design, comprising:

providing a model design;

simulating an interaction of said design with a plurality of digital users, said users each having at least one goal which directs their interaction with said model, including at least two different non-emergency goals; and evaluating a suitability of said design based on a result of said simulation.

In an exemplary embodiment of the invention, simulating comprises modifying said interaction according to an environmental condition.

In an exemplary embodiment of the invention, simulating comprises modifying an environmental condition according to said interaction.

In an exemplary embodiment of the invention, simulating comprises simulating a daily architectural occupational scenario, expected to be played out in the constructed design at least once a week, on the average.

In an exemplary embodiment of the invention, said simulating comprises simulating standing in a queue by a plurality of said digital users, in a manner which interferes with one or both of movement and vision of other digital users.

In an exemplary embodiment of the invention, said two different goals comprise goals in opposite motion directions.

In an exemplary embodiment of the invention, the method comprises adding at least one goal during said simulating.

In an exemplary embodiment of the invention, the method comprises changing the priority of at least one goal during said simulating.

In an exemplary embodiment of the invention, at least one of said digital user has its behavior modified according to a simulation of a visual filed thereof. Optionally, the method comprises following at least one sign by said digital user with a simulated visual field.

In an exemplary embodiment of the invention, the method comprises showing a result of said simulation as a statistic of motion tracks and temporal behavior of said users.

In an exemplary embodiment of the invention, the method comprises manually controlling at least one of said users for at least part of said simulation.

There is provided in accordance with an exemplary embodiment of the invention, apparatus for simulating the interaction of users with a space, comprising:

a model database storing a representation of a space;

a simulation module configured to simulate the movement and interaction of at least one digital user with said representation; and a user database storing at least two goals for said at least one digital user.

In an exemplary embodiment of the invention, the apparatus comprises a goal priority modifying module configured to change a relative priority of said goals.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

As used herein, the terms "comprising" and "including" or grammatical variants thereof are to be taken as specifying the stated features, integers, steps or components but do not preclude the addition of one or more additional features, integers, steps, components or groups thereof. This term is broader than, but includes, the terms "consisting essentially of" and "consisting of".

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions. Optionally, the methods described herein are used to program a general purpose computer and/or on a computer readable medium, such as an optical disk or a magnetic disk and/or stored a computer volatile and/or non-volatile memory and/or accessible over a network.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Exemplary non-limiting embodiments of the invention described in the following description, read with reference to the figures attached hereto. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are:

FIG. 3A depicts an exemplary user interface for visualization of environmental impact of manipulation of a design feature according to some embodiments of the invention;

FIG. 3B depicts an exemplary user interface for visualization of ergonomic impact of manipulation of a design feature according to some embodiments of the invention;

FIGS. 9 and 10 illustrates implementation of modification to physical design features of the space depicted in FIGS. 6-8 in response to observation of the population of simulated users according to an exemplary embodiment of the invention;

DESCRIPTION OF EXEMPLARY EMBODIMENTS

Overview

Figure 1:
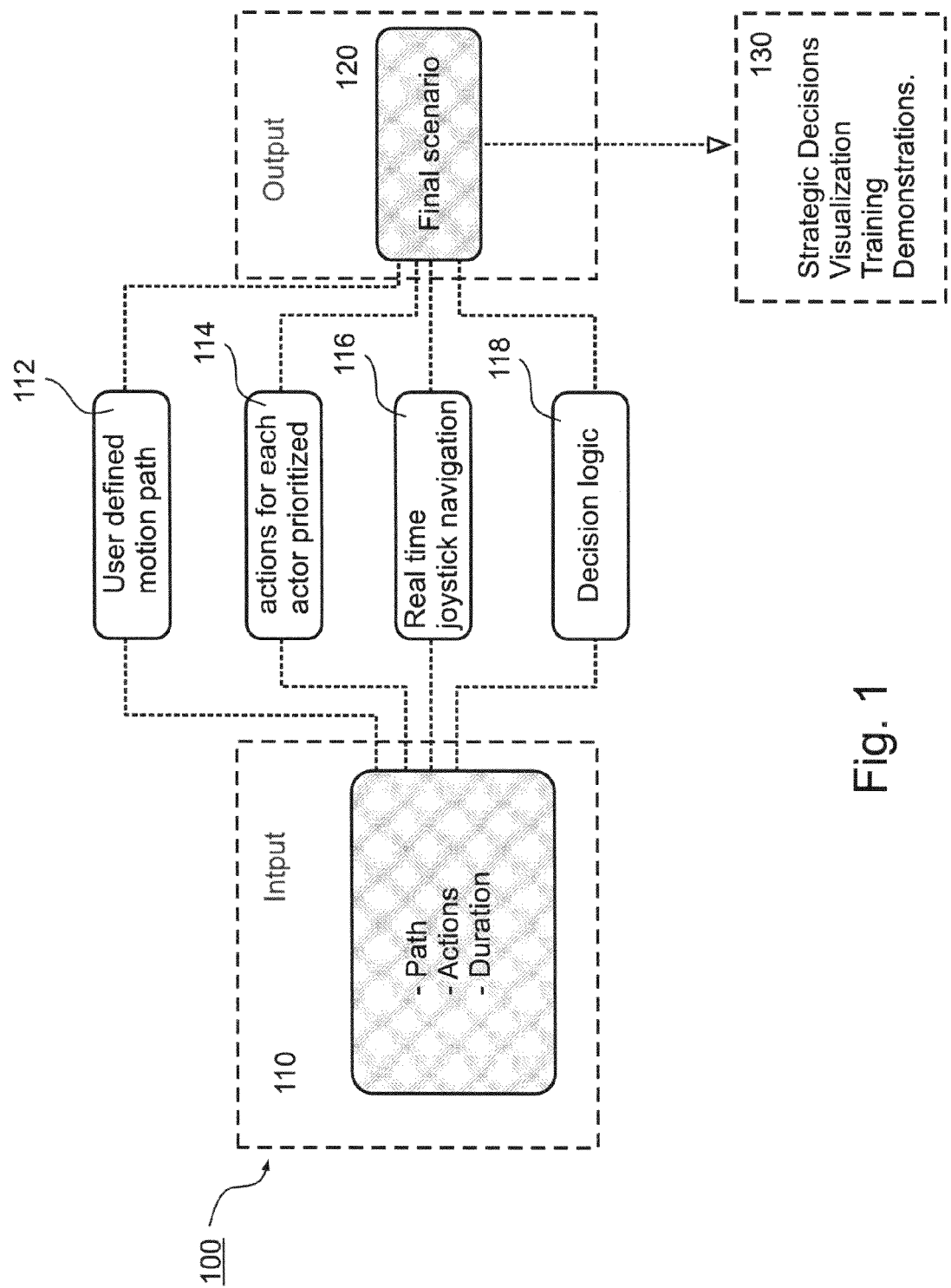
FIG. 1 is a simplified flow diagram illustrating previously available scenario creation software.

Exemplary embodiments of the invention provide hardware and/or software and/or user interfaces which allow a user to evaluate a design. Specifically, the present invention can be used to evaluate a design in terms of interaction between environment and a population of simulated users and/or in terms of ergonomic impact of physical design features on the population of simulated digital users. In an exemplary embodiment of the invention evaluation is based upon a simulation, optionally presented as a graphic animation sequence depicting a population of simulated users engaged in activities within a design space, as a statistical analysis of such a simulation and/or as an interactive simulation that changes when a user interacts with the design and/or simulation. According to various exemplary embodiments of the invention, evaluation of a simulation can be manual (e.g. by visual inspection of an animated graphic sequence) and/or automated (e.g. computerized summary of one or more variables in the simulation).

The term "design" as used herein refers to a representation of a space. Optionally, the space can be an interior space (e.g. a room, hall, theatre, transportation terminal, medical clinic, school, lobby or portion or combination thereof) and/or an exterior space (e.g. park, garden, picnic area, boulevard, parking lot or portion or combination thereof). Optionally, the invention can be used by design professionals, such as architects, to perform virtual testing at an early stage of the design process.

Although software applications which are nominally useful in different stages of the design process described in the background are commercially available (e.g. those applications listed in Table 1), each application is typically used differently by different users for one or more relevant tasks at each stage. Professionals involved in different stages of a project, or different tasks at the same stage, are typically unable to share computer files for work. Transfer of files between different formats and/or applications often encounters problems of mismatching file formats, and corrupted or missing data. Exemplary embodiments of the invention provide an integrated design platform in which a common computer application is used by different professionals during different stages of the design process. Optionally, the integrated design platform contributes to an increase in progress rate and/or a reduction in cost by facilitating cooperation between different people involved in the project. Optionally or alternatively, different tests and design tools are used on a same file, optionally in a same station and/or by a same person, optionally interactively or simultaneously, for example, showing a user environmental effects even as the user is modifying a design, e.g., in response to a user moving or changing the properties of an element, optionally without a specific user request after each such change.

For purposes of better understanding some embodiments of the present invention, as illustrated in FIGS. 2-16, the following description suggests contrasts between some possible methods and exemplary methods in accordance with some embodiments of the invention. A basic animation module is illustrated by the simplified flow diagram of a scenario creation method depicted in FIG. 1.

In FIG. 1, method 100 begins with inputs 110 that define paths and/or actions and duration of activity. Depending on which previously available alternative is employed, inputs 110 can include one or more of a user defined motion path 112, actions for each actor prioritized 114, joystick navigation 116 (optionally in real time) and decision logic 118.

User defined motion path 112: Users manually draw a line for the digital actors to follow.

In a basic method an operator inputs the exact path each actor takes during the animation. In exemplary embodiments of the invention the path some or all digital user will take is an output of the simulation which is not predetermined by the user. The output can result from a variety of factors for example as described hereinbelow with regard to method 200.

Actions for each actor prioritized 114: In a basic method every actor performs a predetermined set of actions for predetermined durations, in a predetermined order while moving along the predetermined path during an animation sequence. In exemplary embodiments of the invention the actions some or each digital user will perform, and/or their duration and/or their order is an output of the simulation. The output results from a variety of factors for example as described hereinbelow with regard to method 200.

Real time joystick navigation 116: In a basic method, during the animation the user can control one or more actors directly and optionally in real time. In exemplary embodiments of the invention simulation is used to control user movement. However, in some embodiments of the invention, joystick navigation is used to change the design while a simulation is in operation, or to modify one actor so that the effect on the simulation due to interaction of other actors with the navigated actors, is shown. Tools other than a joystick may be used as well, for example, a mouse or command (e.g., a command interface or a properties form.

Decision logic 118: In a basic method, decision logic is a means of visual programming, i.e. instead of using scripting languages users can visually create IF and THEN statements. For example in an animation of terror shooting event, digital civilians can be programmed to escape if seeing the bomber, and to crowed around him if and when he lies dead on the ground.

In some basic methods, decision logic can be used to instruct a digital actor to walk along the path until arriving to a certain distance from another actor or object and than switch into running.

In an exemplary embodiment of the invention, operators create multiple relationships between objects and digital users, which in combination with a variety of additional factors (for example basic navigation, vision settings and collision avoidance) creates a hidden and less direct "decision logic" for each digital user. The path each digital user eventually took and the activities it preformed during the simulation, was the indirect result of this decision logic. In principle users should than be able to analyze the results and find what was the exact decision logic of each digital user.

Combination of some or all of the inputs 110 (e.g. 112, 114, 116 and 118) produce output 120 in the form of a final scenario. Methods of the type generally depicted as method 100 can be useful in applications 130 such as strategic decisions, visualization, training and demonstrations. In general, all of these applications are tightly scripted and simulated individuals are constrained from deviating from a precise instruction set. It is characteristic of some basic methods that a scenario exactly duplicates itself every time that it is run. This may be useful when a high degree of predictability/repeatability is favored. In some cases, random number generators are used to randomize one or more parameters. This will typically produce a verity of random appearances to choose from. In an exemplary embodiment of the invention, when random numbers are used, the same general appearance is provided, with random numbers being used to ensure a range of possibilities are covered, while still representing a general behavior.

In summary, basic methods (depicted generally as method 100) use decision logic to predetermine behavior of digital actors in a fixed animation sequence while exemplary embodiments of the invention use decision logic to produce a simulation in which simulated digital users interact with one another and/or with their environment in a less predictable fashion. Optionally, embodiments of the invention do not employ a separate decision logic interface. In an exemplary embodiment of the invention, a user simulation module acts as a sophisticated decision logic mechanism which considers multiple factors as described hereinbelow in the context of method 200.

Figure 2A:
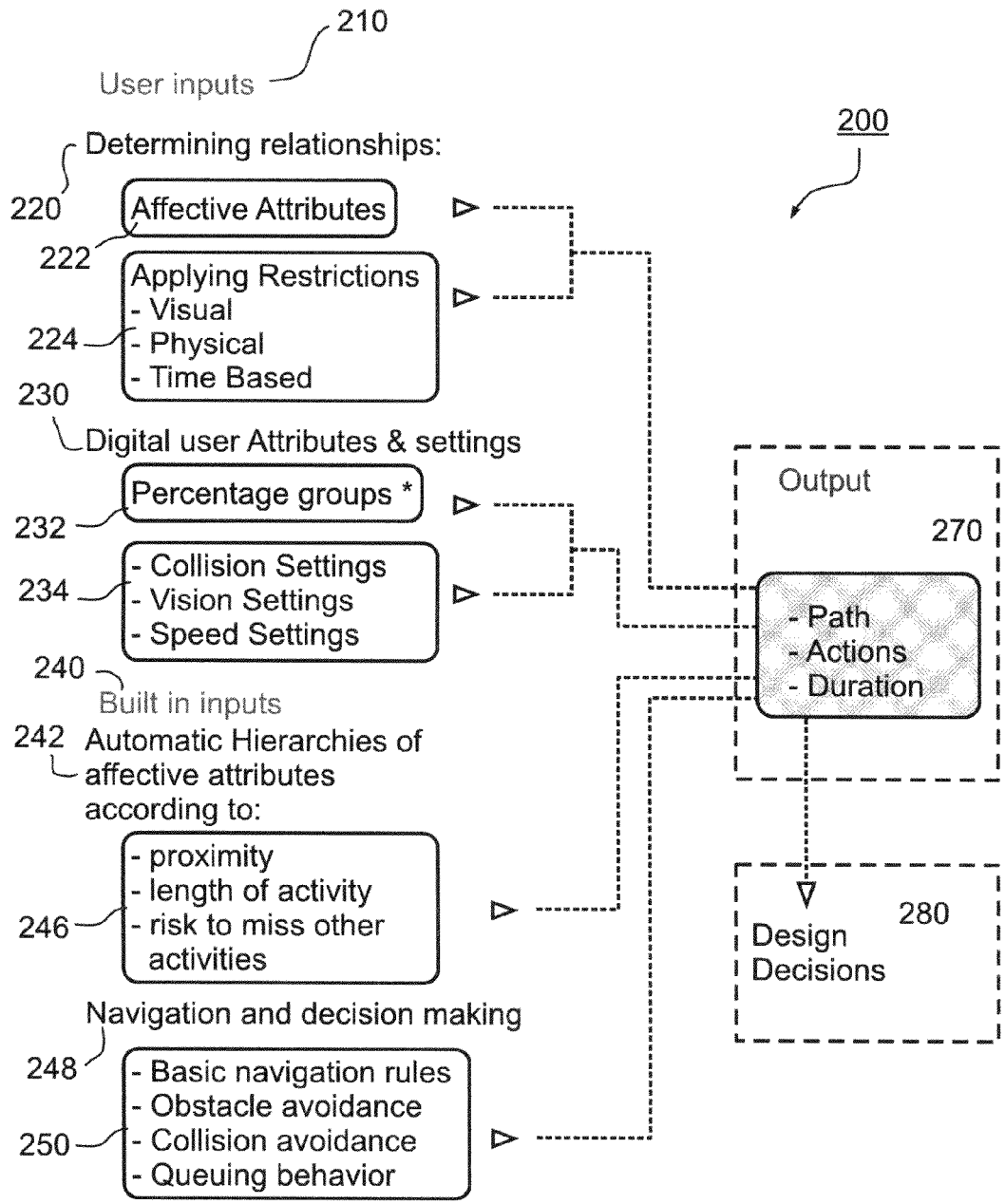
FIG. 2A is a simplified flow diagram illustrating simulation preparation and use according to exemplary embodiments of the invention.

FIG. 2A is a simplified flow diagram illustrating a method 200 of simulation preparation and use according to exemplary embodiments of the invention. In sharp contrast to method 100, path actions and duration of activities pursued by simulated users are outputs 270. Outputs 270 result from interaction of inputs 210.

According to method 200, inputs 210 comprise one or more of determining relationships 220, defining simulated digital user attributes and settings 230 and built in inputs 240.

In various exemplary embodiments of method 200, determining relationships 220 comprises assigning affective, or causative, attributes 222 and/or applying restrictions 224. Optionally, restrictions 224 include, but are not limited to visual, physical and time based restrictions. Optionally, causative attributes 222 can be assigned to objects and/or to simulated digital users.

In various exemplary embodiments of method 200, defining simulated digital user attributes and settings 230 comprises dividing a population of simulated digital users into percentage groups 232 and/or determining digital users' settings 234 (e.g. collision settings, vision settings, speed settings)

In various exemplary embodiments of method 200, built in inputs 240 comprise one or more of automatic hierarchies of affective attributes 242 and/or navigation and decision making properties 248. Optionally, the automatic hierarchies of affective attributes 242 and/or the navigation and decision making properties 248 function as an artificial intelligence (AI) engine.

In an exemplary embodiment of the invention, the automatic hierarchies of affective attributes 242 allow simulated digital users to consider interactions between distance and time 246 (e.g. physical proximity, temporal proximity, length of activity and risk of missing one activity while engaging in another activity)

In an exemplary embodiment of the invention, the navigation and decision making properties 248 allow simulated digital users to emulate lifelike behaviors 250 (e.g. adherence to basic navigation rules, obstacle avoidance, collision avoidance and queuing behavior)

According to method 200, individual members of a population of simulated digital users programmed with inputs 210 and deployed in a model space for a simulation will each provide a simulated output 270 definable as a path and/or action and/or duration. If the simulation is run multiple times with the same model space and the same population of simulated digital users programmed with same inputs 210 behavior of the population as a whole within the space is expected to vary and behavior of specific individuals within the population is also expected to vary. Optionally, interaction between simulated digital users contributes to the variation. In an exemplary embodiment of the invention, repeated runs of a same simulation can be useful in discovering problems that occur only infrequently (e.g. hourly, daily, weekly, monthly or annually or intermediate or greater intervals).

Analysis of population behavior, including but not limited to observation of infrequent problems can be useful in making design decisions 280.

Exemplary Method of Evaluating Design Based on Behavior of Simulated Population.

Figure 2B:
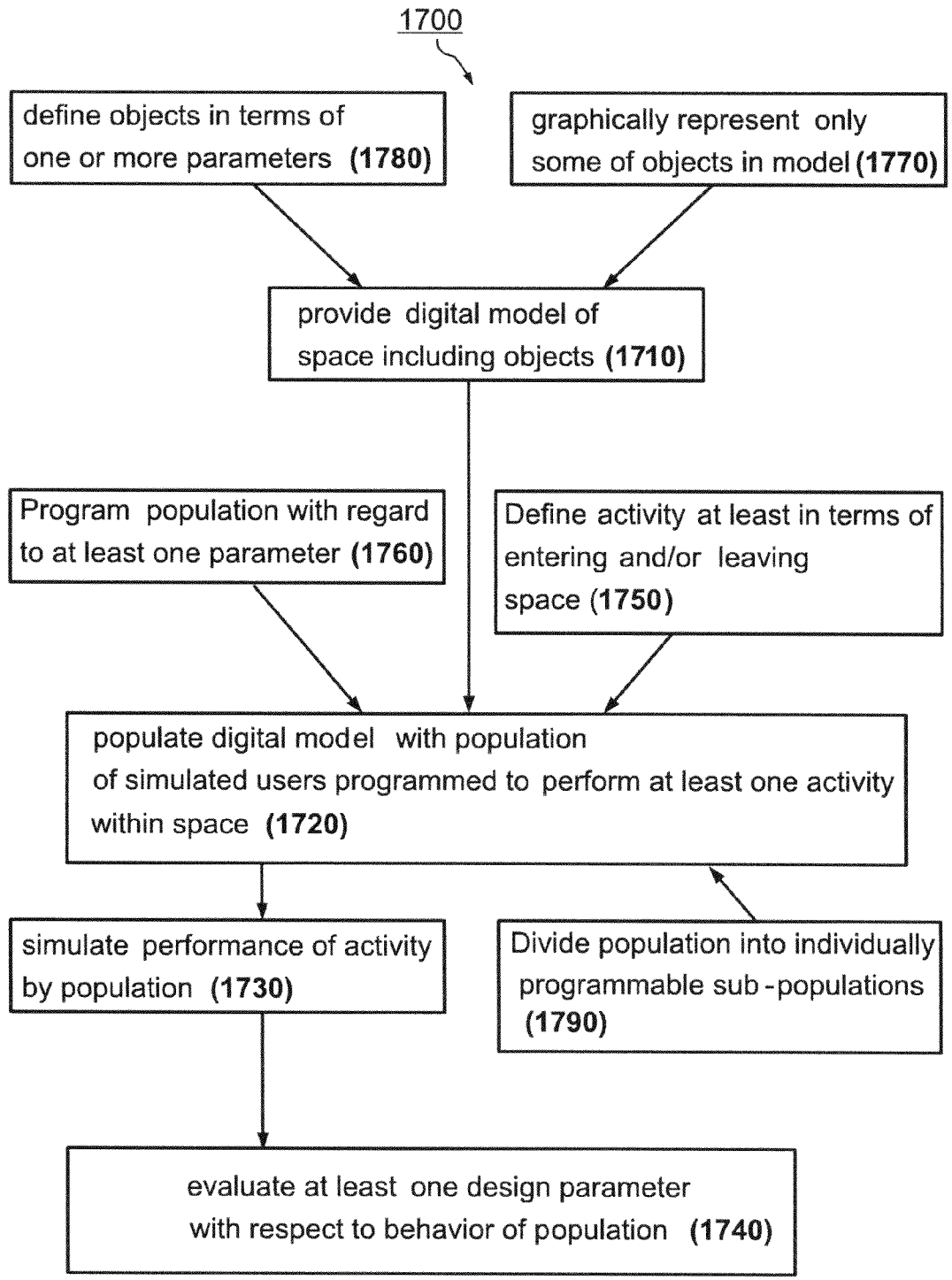
FIG. 2B is a simplified flow diagram of a method for evaluating design parameters according to exemplary embodiments of the invention.

FIG. 2B is a simplified flow diagram of an exemplary method 1700 of evaluating an architectural design. Method 1700 includes providing 1710 a digital model of a space including objects and populating 1720 the digital model with a population of simulated users preset to perform at least one activity within the space. In an exemplary embodiment of the invention, the activity is defined 1750 at least in terms of entering and leaving the space depicted by the model.

In an exemplary embodiment of the invention, objects are defined 1780 with respect to one or more parameters. These parameters can include conventional object parameters (e.g. length, width, height, thickness, location, color, degree of opacity, thermal properties and acoustic properties and/or affective or causative attributes (e.g. a degree and/or type of influence an object has on a simulated digital user or subpopulation of simulated digital users. According to various exemplary embodiments of the invention, affective or causative attributes include, but are not limited to, attraction, repulsion, restrict location and follow.

In an exemplary embodiment of the invention, only some of the defined objects are graphically represented 1770 in the model. Examples of objects not graphically represented in a model include, but are not limited to, airflow from an air conditioning conduit and areas of direct sunlight near a window and noisy areas. Objects not graphically represented in the model can still influence members of the population in the modeled space. Such objects can be schematically shown, for example, as fields or shaded areas.

In an exemplary embodiment of the invention, the population is pre-set by programming 1760 with regard to at least one parameter. Optionally, the parameter includes one or more of a response to environmental conditions, object identification, response to population density, response to groups of people, response to individuals and line waiting behavior. The term "programming" as used herein indicates, in some embodiments of the invention, the use of a user friendly data input interface, for example a menu and/or dialog based interface or a visual programming interface. According to exemplary embodiments of the invention, it is possible to use the invention without knowledge of any scripting and/or programming language. In an exemplary embodiment of the invention, the interface allows a user to select from existing alternatives. In some embodiments however, scripting and/or programming languages are to designate some or all behavior which does not exist as a preset. In an exemplary embodiment of the invention, a common, similar and/or same "look and feel" interface is provided for multiple professional activities/functionalities.

Alternatively, or additionally, the parameter includes one or more of a degree of attraction to objects, a degree of attraction to simulated users, a response to visual stimuli (e.g. signs) and at least one secondary activity. In an exemplary embodiment of the invention, an individual programmed to pursue a secondary activities may do so in every simulation run (mandatory) or only if consideration of one or more other factors (e.g. time and/or distance) make the secondary activity feasible (optional).

Once population provided 1710 space has been populated 1720, simulation 1730 of activity of the population within the space is conducted. Based upon the simulation 1730 outcome, evaluation 1740 of at least one design parameter with respect to at least one behavior of the population is conducted. For example, one or more simulation runs can reveal areas within the space where population density exceeds acceptable levels and/or where simulated users are delayed in attempting to perform programmed activities. These types of problems, reflected in behavior of the population, can suggest physical manipulation of objects within the space to a design professional reviewing simulation results. Optionally, these problems can be visually apparent to a viewer of the simulation and/or automatically detected (e.g. by computerized analysis).

In an exemplary embodiment of the invention, individual members of the population interact with one another within the space. Optionally, the interaction is random, or has the appearance of randomness (pseudo random). In an exemplary embodiment of the invention, pseudorandom interaction of simulated digital users belonging to the population contributes to quality of evaluation 1740 of design parameters. Optionally, the at least one activity is defined 1750 at least in terms of entering the space and leaving the space.

In an exemplary embodiment of the invention, the population is divided 1790 into individually programmable subpopulations. Optionally, a single digital user can belong to two or more sub-populations. For example in a simulation of children entering a school building after a recess the population might be divided into four sub-populations of 25% each corresponding to four classrooms along a corridor. Alternatively, or additionally, the population might be divided into two sub-populations based on stopping at a lavatory (60%) and proceeding directly to the classroom (40%). In this example, each digital student is defined by a subpopulation indicating one of four classrooms and is also defined by a subpopulation indicating whether they visit the lavatory after recess.

It is an important feature of some embodiments of the invention that a relatively large number of simulated individuals can be programmed with a small number of programming inputs. Using the example described in the preceding paragraph, a scenario programmer might input total number of students as 120, and assign an initial division into subpopulations of 25% (30 students) each with a destination corresponding to one of the four classrooms. The 60%/40% division regarding lavatory stops can be input for the population of 120 students. Optionally, this input can be applied per classroom (nested or dependent variable) or to the population as a whole (independent variable). In this way, behavior of 120 students is programmed with only two programming inputs for a simple simulation.

This type of programming gives rise to pseudo-random simulations in which behavior of individuals with respect to one another can vary from one simulation run to another, although behavior of the population with respect to the space remains substantially constant.

In some exemplary embodiments of the invention, one or more objects in the model are defined as an environmental zone. Optionally, the environmental zone is defined in terms of one or more environmental conditions (e.g. temperature between 22 and 25 degrees C. and/or noise level below 75 dB). Optionally, objects comprising environmental zones are graphically depicted in the model or are not visible in the model.

Various types of simulation may be used, for example, a fast simulation may be used and its results shown. In another embodiment, a simulation is run and aggregate results or otherwise statistically processed results, may be shown. In some embodiments of the invention, direct calculation is used instead of simulation.

Various display methods may be used, for example, after specifying the location of a building and material attributes a user can view a graph showing, for example, temperatures or light levels along the day. Similarly, numeric data can represent user simulation, for example after defining all the parameters for a simulation of digital users seeking an emergency exit, it is possible instead of running and viewing the actual simulation, to view a graph showing durations (e.g., average, maximum) it takes digital users to find the exit.

Exemplary Apparatus for Simulating Behavior of Population within a Space

Figure 2C:
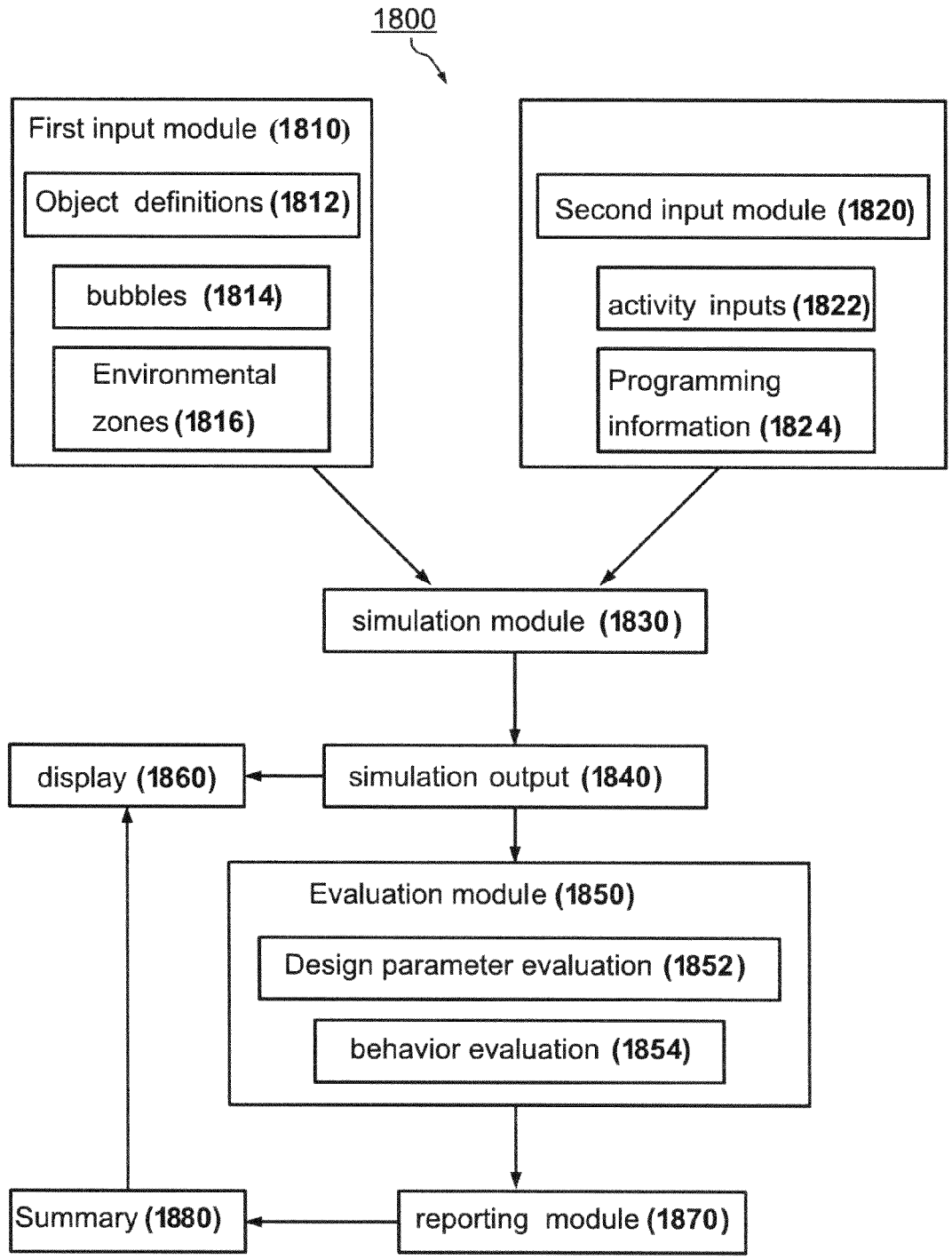
FIG. 2C is a schematic block diagram of an apparatus according to exemplary embodiments of the invention.

FIG. 2C is a schematic block diagram of an exemplary apparatus for architectural analysis 1800. Apparatus 1800 includes a first input module 1810 configured to accept a digital model of a space including object definitions 1812 as an input. Optionally, objects are defined in terms of one or more parameters as described above. In an exemplary embodiment of the invention, objective definitions include one or more causative attributes. Optionally, some objects are defined as bubbles 1814 and/or environmental zones 1816.

Apparatus 1800 includes a second input module 1820 configured to accept programming information 1824 for a population of simulated users, the programming information including at least one activity 1822 within the space. In an exemplary embodiment of the invention, programming information 1824 is provided for a plurality of sub-populations.

In an exemplary embodiment of the invention, programming information 1824 pertains to one or more parameters including, but not limited to, response to environmental conditions, object identification, response to population density, response to groups of people, response to individuals and line waiting (queuing) behavior.

Apparatus 1800 includes a simulation module 1830 configured to provide a simulation comprising pseudo random interaction of the simulated users within the space as an output. In an exemplary embodiment of the invention, simulation output 1840 is presented as a graphic animation sequence depicting the population of simulated users engaged in activities within the space on a display 1860.

Optionally, simulation output 1840 can be viewed from one or more angles (e.g. lateral view, top plan view or viewpoint of a simulated digital user engaged in an activity) on display 1860. In an exemplary embodiment of the invention, the viewpoint can be changed during the simulation. Interfaces for changing viewpoint of a graphic animation sequence are known and one of ordinary skill in the art will be able to adapt an existing interface for use in the context of exemplary embodiments of the invention.

In an exemplary embodiment of the invention, apparatus 1800 includes an evaluation module 1850. Optionally, evaluation module 1850 conducts design parameter evaluation 1852 and/or behavior evaluation 1854. According to various exemplary embodiments of the invention, evaluation module 1850 can generate tables and/or graphs and/or color maps indicating how the population as a whole, and/or a selected sub-population and/or individuals within the population perform the at least one activity within the space. Optionally, evaluation module 1850 can delimit environmental zones and/or bubbles.

In an exemplary embodiment of the invention, evaluation module 1850 is configured to evaluate the output with respect to at least one design parameter. For example evaluation module 1850 might calculate total time between train arrival and departure of a last passenger from the train from a terminal. Alternatively, or additionally, evaluation module 1850 can calculate average time between train arrival and departure of a passenger from the terminal. Alternatively, or additionally, evaluation module 1850 can count how many arriving passengers buy food or drink before departing the terminal.

In an exemplary embodiment of the invention, evaluation module 1850 is configured to evaluate the output with respect to at least one behavior of the population. For example, if eight turnstiles are provided for departing passengers in a train terminal, it may be significant that turnstiles seven and eight handled significantly less passengers than an average of turnstiles one through six. Such a statistic provided by evaluation module 1850 can suggest to a design professional that placement of the turnstiles should be adjusted. Optionally, adjustment of placement of turnstiles contributes to a reduction in total time between train arrival and departure of the last passenger from the train from the terminal and/or average time between train arrival and departure of passengers from the terminal.

In an exemplary embodiment of the invention, apparatus 1800 comprises a reporting module 1870. Optionally, reporting module 1870 is configured to prepare a summary 1880 of output 1840 from simulation module 1830. Optionally, summary 1880 can be a graphic summary or a numerical summary.

Optionally, a graphic summary can present bubbles as an output. In an exemplary embodiment of the invention, a graphic summary is presented as a picture of the modeled space with usage information (e.g. bubbles) overlaid.

Alternatively, or additionally, a numerical summary (e.g. mean±SD) of relevant parameters can be presented. Optionally, the numerical summary can be presented as a table, graph or histogram. Numerical summaries can be displayed on display 1860 and/or printed and/or stored in memory.

In an exemplary embodiment of the invention, numerical summaries stored in memory are compared to one another (e.g. by evaluation module 1850). Optionally, comparison of this type contributes to usefulness and/or reliability of improvements resulting from changes in design inputs.

In an exemplary embodiment of the invention, simulation module 1830 and/or evaluation module 1850 provide output comprising bubbles representing a space needed for a function to be performed by at least some members of the population.

Optionally, simulation module 1830 and/or evaluation module 1850 delimit at least one zone representing a defined environmental condition.

In an exemplary embodiment of the invention, a change in an object entered via first input module 1810 alters at least one parameter of the zone. Optionally, alteration of the zone is simulated by simulation module 1830 and/or evaluated by evaluation module 1850 and/or reported by reporting module 1870.

Exemplary Method for Evaluating Interaction Between a Population and a Space

Figure 2D:
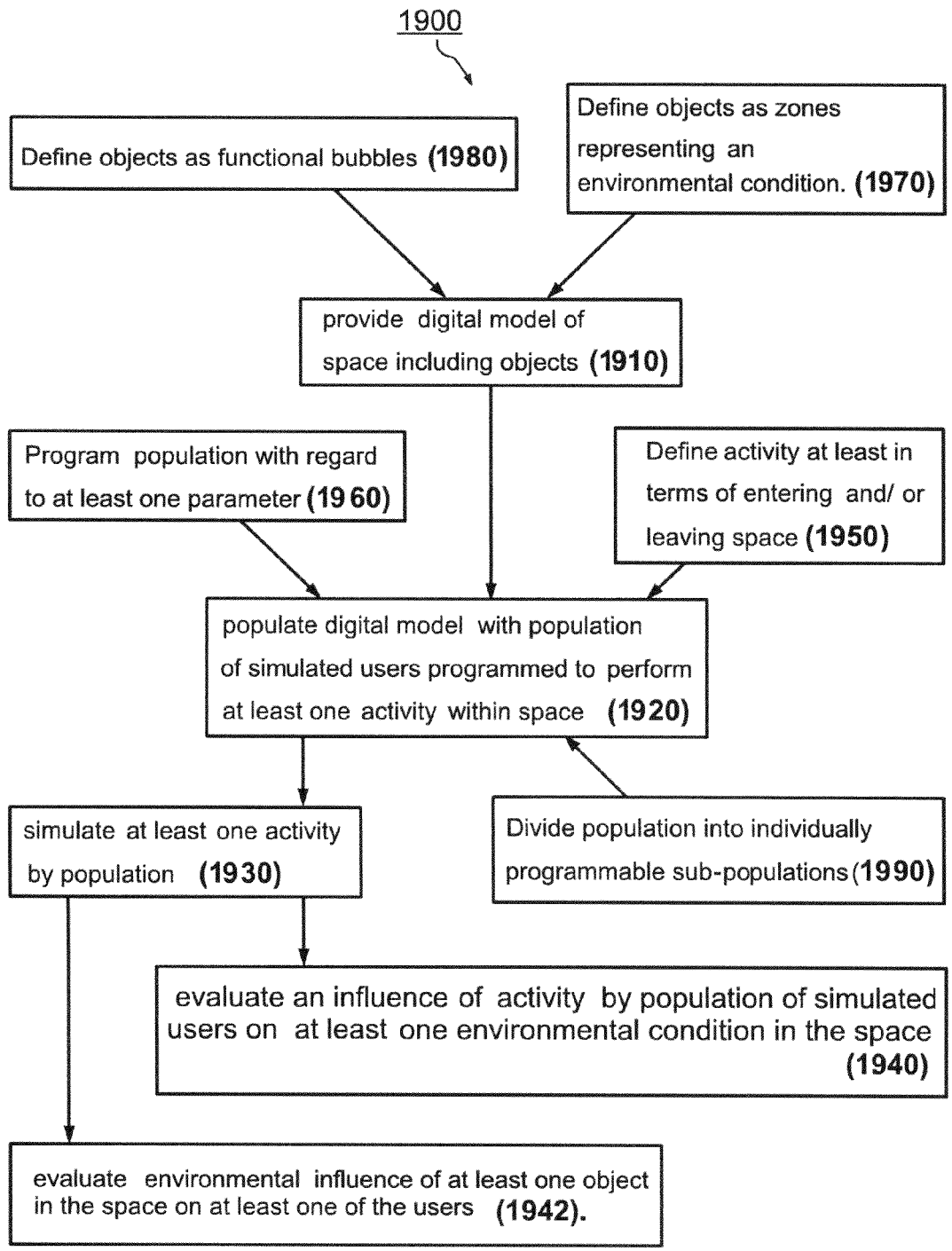
FIG. 2D is a simplified flow diagram of a method for interaction between users and environment according to exemplary embodiments of the invention.

FIG. 2D depicts an exemplary method 1900 of evaluating an architectural design. Exemplary method 1900 includes providing 1910 a digital model of a space including objects and populating 1920 the digital model with a population of simulated users preset to engage in at least one activity within the space. Alternatively, or additionally, the population is programmed 1960 with regard to at least one parameter (e.g. smoker or non-smoker).

In another example, shoppers in a book shop can be divided into groups according to their interest, 20% look for science books, 30% for art, etc. Each sub-population is then optionally supplied with its own causative attributes of attraction to the relevant area in the shop (e.g., nested variables). Then it is possible to add, for example an attraction to the cashier, for all the shoppers (e.g., an independent variable). It is then possible to restrict the attraction to the cashier differently for each group (e.g., nested variables).

In some embodiments of the invention, this freedom to specify independent or nested variables makes it possible to quickly create simple scenarios, and then incrementally increase their accuracy and/or complexity.

In an exemplary embodiment of the invention, the at least one activity is defined 1950 at least in terms of entering and/or leaving the space. According to method 1900, simulating 1930 the at least one activity by the population facilitates evaluating an interaction between the users and the space during the at least one activity.

In some exemplary embodiments of method 1900 the interaction comprises internal gain. Internal gain is an influence 1940 of activity by the population (or portion thereof) of simulated users on at least one environmental condition in the space. For example, a crowd of people waiting at an elevator can produce internal gain in the form of a localized temperature increase and/or a localized increase in noise level. In an exemplary embodiment of the invention, identification and presentation of internal gain related issues permits a design professional to test various design solutions in successive simulation runs.

In some exemplary embodiments of method 1900 the interaction comprises at least one environmental influence 1942 of at least one object in the space on at least one of the users. For example, a simulated digital user walking down a corridor may be subject to a temperature of 24 degrees centigrade if the user is within 1 meter of floor to ceiling windows on either side of the corridor and subject to a temperature of 22 degrees centigrade if the user is more than 1.5 meters from the windows (assuming outdoor temperature is greater than 24 degrees centigrade). Optionally, identification and presentation of issues related to environmental influence of objects in the space on at least one of the users permits a design professional to test various design solutions in successive simulation runs.

Optionally, at least some objects are defined 1970 as zones representing an environmental condition and/or are defined 1980 as functional bubbles. For example, a restaurant dining room might be divided into a smoking area and a non-smoking area. In an exemplary embodiment of the invention, the non-smoking area serves as an environmental zone (smoke concentration defined as $\leq 50$ PPM). In an exemplary embodiment of the invention, the smoking area serves as a bubble (area designated for the activity of smoking).

Alternatively, or additionally, objects can be defined using causative attributes. In the case of the dining room divided into smoking and no-smoking areas, the smoking designation can be used as a causative attribute. In an exemplary embodiment of the invention, the population is divided 1990 into two sub populations, each individually programmable. Optionally, a smoking sub-population (e.g. 15%) is programmed to be attracted to the smoking area and/or repelled by the non-smoking area of the dining room. Conversely, a smoking sub-population (e.g. 85%) is programmed to be attracted to the non-smoking area and/or repelled by the smoking area of the dining room.

In some exemplary embodiments of method 1900, manipulating at least one parameter of the zone serves a means of manipulating at least one object in the model. For Example, adjusting the criteria of the non-smoking area to $\leq 100$ PPM smoke concentration could increase the size of the area, optionally allowing more tables to be placed in the area.

Alternatively, or additionally, in some exemplary embodiments of method 1900 invention, manipulating at least one object in the model as a means of manipulating at least one parameter of the zone. For example, adding an exhaust fan in the smoking area, or increasing a capacity of an existing fan upwards, could increase the size of the non-smoking area, optionally allowing more tables to be placed in the non-smoking area.

Environmental conditions for the purpose of exemplary method 1900 include, but are not limited to, temperature, relative humidity, airflow, air contaminant concentration, light level, sun/shadow areas, noise level and noise type. In an exemplary embodiment of the invention, method 1900 considers more than one environmental condition.

Exemplary Apparatus for Environmental Evaluation of a Space

Figure 2E:
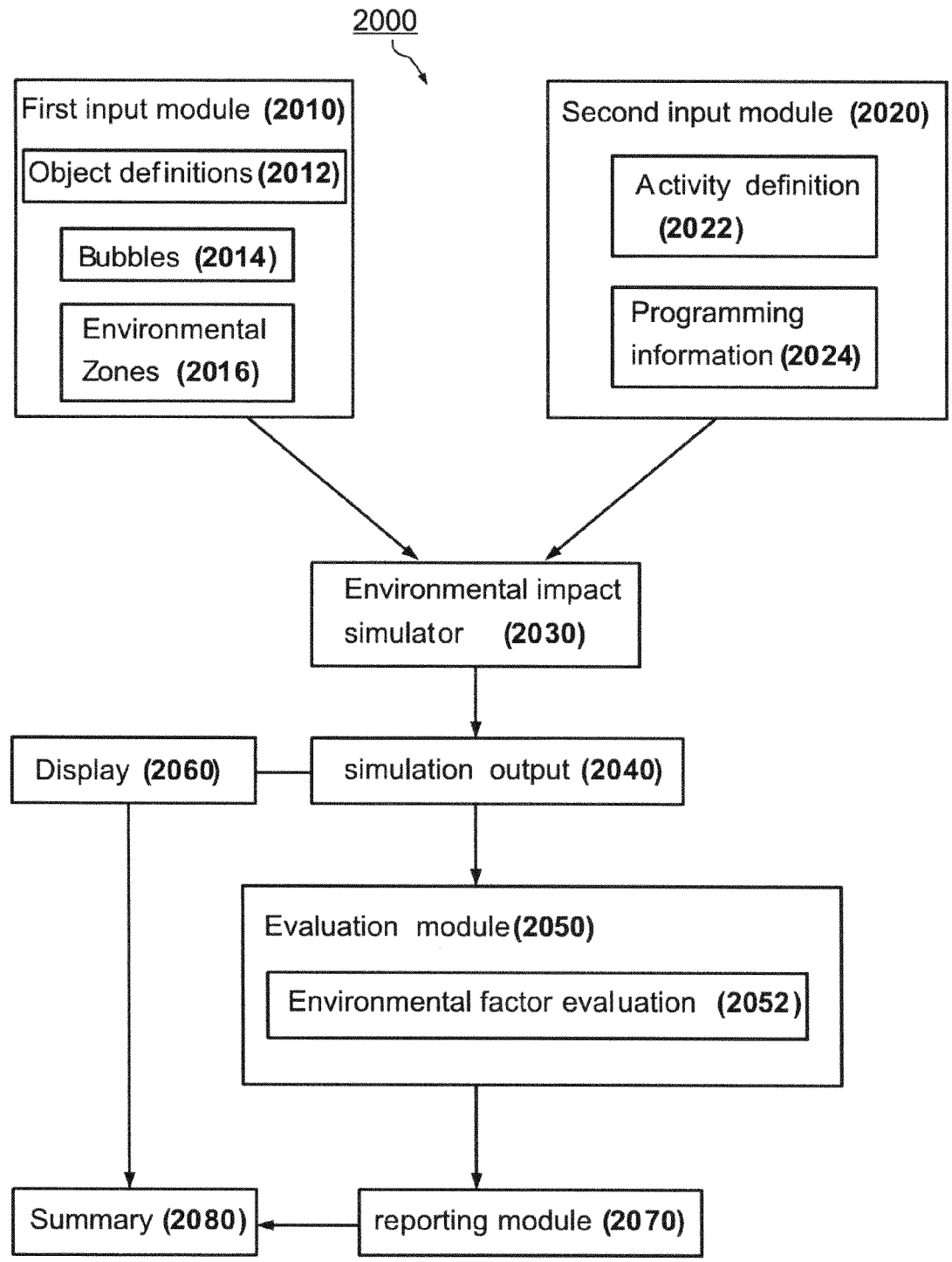
FIG. 2E is a schematic block diagram of an apparatus according to other exemplary embodiments of the invention.

FIG. 2E is a schematic representation of an exemplary apparatus 2000 for architectural analysis including a first input module 2010 configured to accept a digital model of a space including objects 2012 as an input and a second input module 2020 configured to accept programming information 2024 and definitions 2022 for at least one activity to be pursued by a population of simulated digital users within the space. Optionally, the first input model can accept input in the form of bubbles 2014 and/or environmental zones 2016.

In an exemplary embodiment of the invention, apparatus 2000 employs an environmental impact simulator 2030 configured to calculate an interaction between the users and the space during the at least one activity within the space. Optionally, the interaction can include internal gain and/or environmental influence of at least one object in the space on at least one of the users as described hereinabove in the context of method 1900.

In an exemplary embodiment of the invention, environmental impact simulator 2030 provides environmental output data in the form of a simulation output 2040. Optionally, simulation output 2040 is displayed on a display 2060 and/or evaluated by an optional evaluation module 2050. In an exemplary embodiment of the invention, evaluation module 2050 performs evaluation 2052 of one or more environmental factors. Evaluations can be stored in memory and/or relayed to a reporting module 2070. In an exemplary embodiment of the invention, the reporting module 2070 prepares a summary 2080. Summary 2080 can be stored in memory and/or printed and/or displayed on display 2060. According to various embodiments of the invention, simulation output 2040 and/or summary 2080 can be prepared in a wide variety of graphic and/or numerical formats as described hereinabove in the context of apparatus 1800 except that the simulation and/or summary will deal primarily with environmental factors (e.g. temperature, noise, airflow and light) as opposed to population behavior. Optionally, the summary includes bubbles indicating a space allocated for at least one of the at least one activities and/or environmental zones indicating boundaries for one or more environmental conditions.

In an exemplary embodiment of the invention, evaluation module 2050 is configured to suggest a change with respect to at least one environmental factor. Optionally, the change is suggested to have a positive impact on performance of the at least one activity by the population of simulated digital users.

In an exemplary embodiment of the invention, a change in at least one parameter of an environmental zone 2016 entered via first input module 2010 serves as a means of manipulating at least one object in the model. Alternatively, or additionally, a change in an object 2012 entered via the first input module 2010 alters at least one parameter of the zone 2016.

Environmental conditions for the purpose of exemplary apparatus 2000 are as described hereinabove for method 1900.

Exemplary Queuing Behavior

Figure 2F:
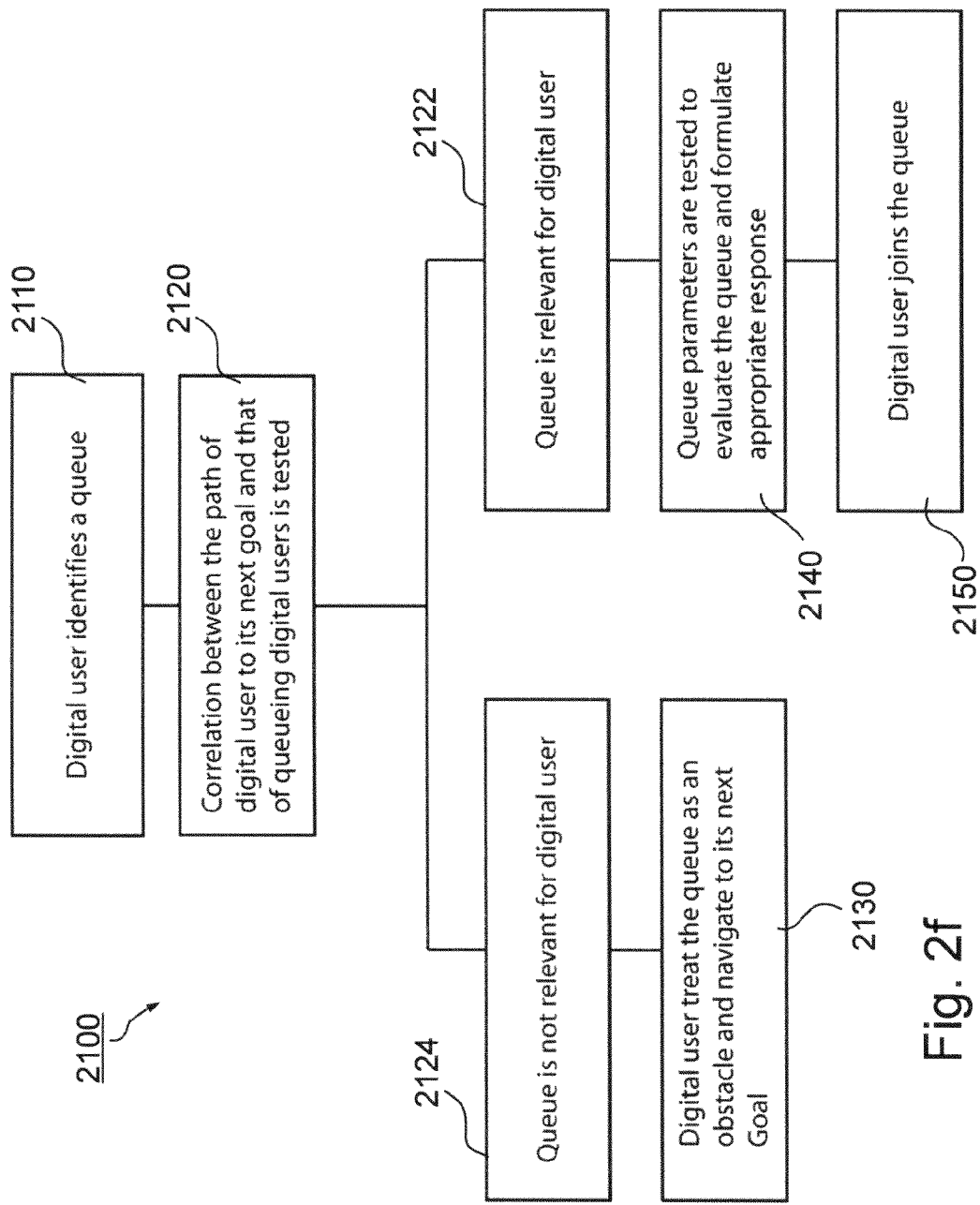
FIG. 2F is a simplified flow diagram of a method for implementing queuing (line waiting) for simulated users according to an exemplary embodiment of the invention.

FIG. 2F is a simplified flow diagram illustrating an exemplary method 2100 for achieving realistic queuing (line waiting) behavior for simulated digital users. Method 2100 can be employed advantageously in simulations according to exemplary embodiments of the invention.

At 2110 a digital user identifies a queue. Identification can be, for example, by means of virtual (human like) vision. Techniques for 3-D computer vision will be easily incorporated into the context of embodiments of the invention without undue experimentation by one of ordinary skill in the art. Optionally, virtual vision employs a cone of vision and head movements so that simulated digital users scan their environment in much the same way as actual people do. Virtual vision can contribute to identification of objects, other virtual users and special configurations of groups of people. In an exemplary embodiment of the invention, a queue comprises one special configuration of a group of people. (Other special configurations include, but are not limited to overcrowding, under crowding, conversational groupings and spectator groupings). Optionally, a response of simulated digital users to these special configurations is part of their navigation capabilities. In an exemplary embodiment of the invention, these responses relate to collision detection and/or obstacle avoidance.

In an exemplary embodiment of the invention, simulated digital users evaluate their path toward a next goal related to a current activity and decide how to treat moving and static obstacles on the way. Optionally, a queue constitutes a special obstacle type.

At 2120 the digital user tests a correlation (e.g. by means of an AI engine) between their own path and apparent paths of queuing digital users. Optionally, queuing digital users can reveal their path by orientation and/or velocity.

In an exemplary embodiment of the invention, queues create relative conformity in an orientation of queue members. Optionally, orientation of many, sometimes a majority, sometimes substantially all, members of a queue indicates direction to their next goal.

In an exemplary embodiment of the invention, a queue affects the speed of queue members. Optionally the queue slows queue members down to some degree. Optionally, the degree of slow down can comprise a minor de-acceleration (e.g. pedestrians using an escalator) to a complete stop (e.g. people waiting for an elevator). In an exemplary embodiment of the invention, a simulated digital user encountering a queue establishes an average speed of the queue by measuring the average time it takes queue members to advance a certain distance.

In an exemplary embodiment of the invention, the simulated digital user decides either that the queue is not relevant 2124 or is relevant 2122 based upon the test 2120 of the correlation.

If the queue is not relevant 2124, the simulated digital user treats the queue as an obstacle and navigates around, or through, the queue in pursuit of a goal related to their current activity.

If the queue is relevant 2122, the simulated digital user tests 2140 queue parameters and formulates an appropriate response. Testing 2140 can include evaluation of intervening distance between queue members and/or a degree to which the queue blocks access to a goal and/or queue length.

Optionally, evaluating intervening distance between queue members can help differentiate an organized queue from a chaotic queue.

Optionally, evaluating a degree to which the queue blocks access to a goal (e.g. the shortest route) can indicate to the digital user a degree of relevancy of the queue.

Optionally, the overall length of a queue combined with its average speed, can help in estimating its attractiveness in relation to other queues, in cases where there is more then one queue.

At 2150 the digital user joins a queue based upon testing 2140.

Various exemplary embodiments of the invention allow simulated digital users to deal with different types of queues varying from a clear single line (e.g. in front of a cashier or ATM machine) to chaotic crowd formations (e.g. at an entrance to a football stadium or an audience entering through wide theater doors.)

Different combinations and intensities of queue parameters described hereinabove can help a virtual digital user identify and/or classify and/or select an appropriate reaction to one or more queues. Once a queue is identified and classified, the digital user can join the queue by conforming their location, speed and orientation to the queue or avoid the queue.

Optionally, simulated digital users can switch between queues, for example if an initial queue selection appears less attractive than another available queue.

The above digital user logics are optionally carried out using commercially available AI engines (e.g., for gaming) that are adapted to apply prioritization and decision making by simulated digital users engaging in an activity in a model space in accordance with various exemplary embodiments of the invention (e.g., instead of direct programming of such behaviors using standard programming languages). For example, such an AI engine may be used to facilitate queuing behavior as described hereinabove as well as other types of behavior described in the context of simulations elsewhere in the application. Such an AI engine may be selected due to its ability to support rule phrasing.

Goals and Priorities

In an exemplary embodiment of the invention, a digital user can have multiple goals. Optionally, the goals are followed in order of priority. Optionally or alternatively, the goals are followed in parallel, by weighting of goals that may be carried out at same time (e.g., "stay out of sun" and "get to check out counter", can be done at a same time, but modifying a path).

Optionally, goals can change priority and/or be created/deleted, for example, based on external (e.g., time, fire) or internal events (e.g., meeting another user, existence of queue).

In an exemplary embodiment of the invention, goals are crated and/or change priority based on occupancy. For example, goals may depend on the availability of a checkout counter vs. a line at a butcher, whereby a user goes to shorter line or sits down and drinks coffee instead of standing in a queue, if coffee is available.

Exemplary Use of Signage

Figure 2G:
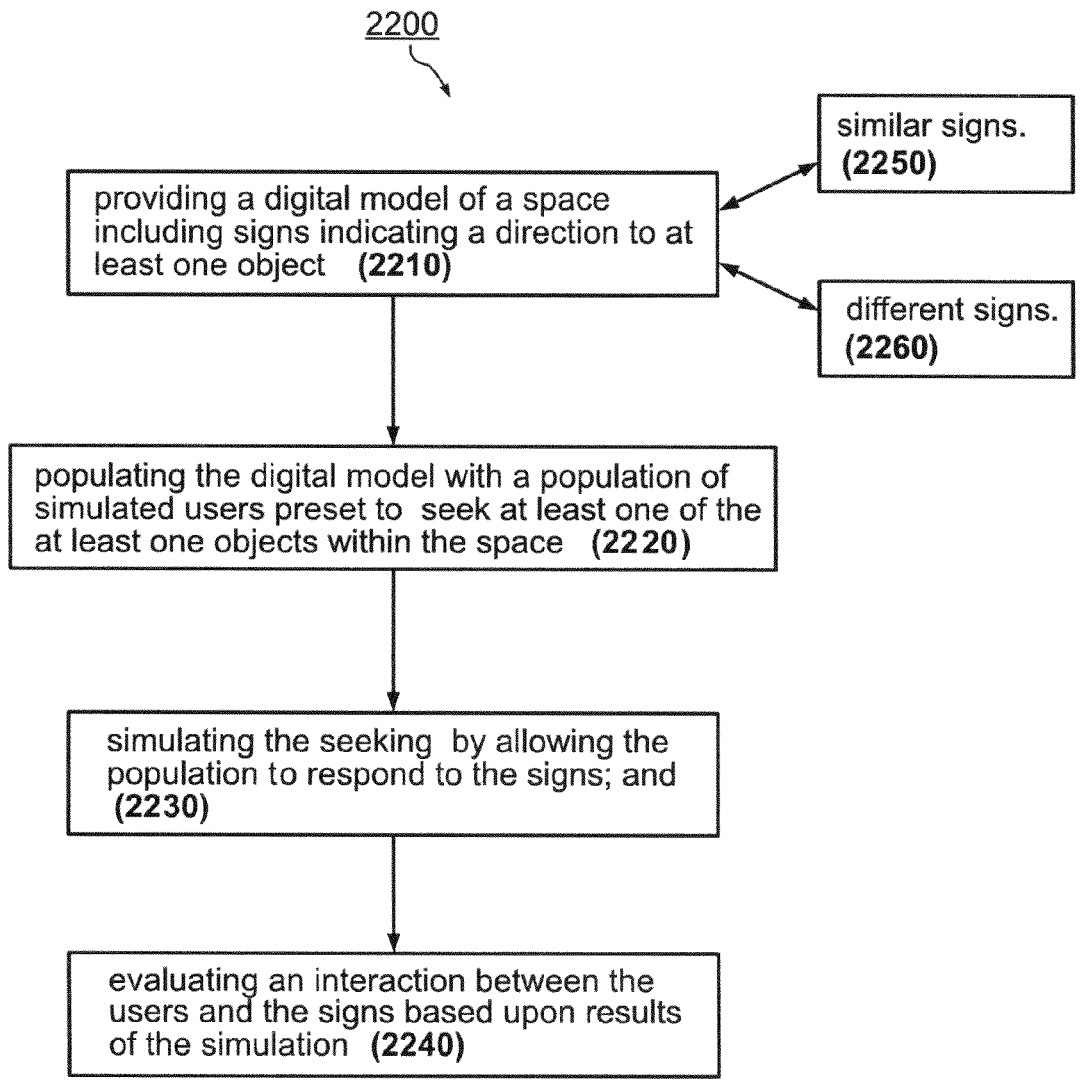
FIG. 2G is a simplified flow diagram of a method for implementing navigation according to signs for simulated users according to an exemplary embodiment of the invention.

FIG. 2G is a simplified flow diagram illustrating a method 2200 of evaluating signage comprising providing 2210 a digital model of a space including signs indicating a direction to at least one object. According to various exemplary embodiments of the invention, the objects are related to one or more activities which one or more digital users are programmed to engage in. In an exemplary embodiment of the invention, the signs are organized in one or more sequential series, each series leading to one object. Optionally, method 2200 is practiced in conjunction with methods 1700 and/or 1900 and/or is practiced in conjunction with apparatus 1800 and/or 2000. In an exemplary embodiment of the invention, simulated digital users employ virtual vision as described hereinabove in the section entitled "Exemplary Queuing behavior" to detect signs as they move through a model space.

Method 2200 also includes populating 2220 the digital model with a population of simulated users preset to seek at least one of the at least one objects within the space and simulating 2230 the seeking by allowing the population to respond to the signs. Optionally, simulated digital users are programmed to seek the signs themselves in addition to, or instead of, objects which the signs indicate. In an exemplary embodiment of the invention, method 2200 includes evaluating 2240 an interaction between the users and the signs based upon results of the simulation.

Optionally, the seeking comprises following two or more similar signs. For example, a simulated digital user seeking a public telephone might follow a series of signs with a telephone icon to a phone kiosk.

Alternatively, or additionally, the seeking comprises following two or more different signs. For example, arriving passengers in a train terminal might follow signs that say "Exit Level 2" to a staircase and/or escalator. Upon reaching level two, the simulated digital users might follow signs that indicate "Fourth Ave" and/or "Fifth Ave." to reach a desired exit. Optionally, a population of simulated digital users is divided into sub-populations programmed to exit on Fourth and Fifth Avenues respectively. In an exemplary embodiment of the invention, signs indicating specific exits (e.g. Fourth Ave and/or Fifth Ave.) are programmed with a change sensitivity change sensitivity 536 causative attribute which causes certain simulated digital users to become sensitive to attraction by a specific exit indicated on the sign.

Optionally, method 2200 contributes to an ability to identify and analyze issues related to signage in the space. Issues related to signage include, but are not limited to, sign location, sign size, sign color, text and/or icon size, text and/or icon color, visibility (e.g. lines of sight and/or height above floor) and distance between signs in a series. In an exemplary embodiment of the invention, testing of different issues related to signage in simulations permits a design professional to test various sign options in successive simulation runs.

Exemplary Fast Feedback

Figure 4:
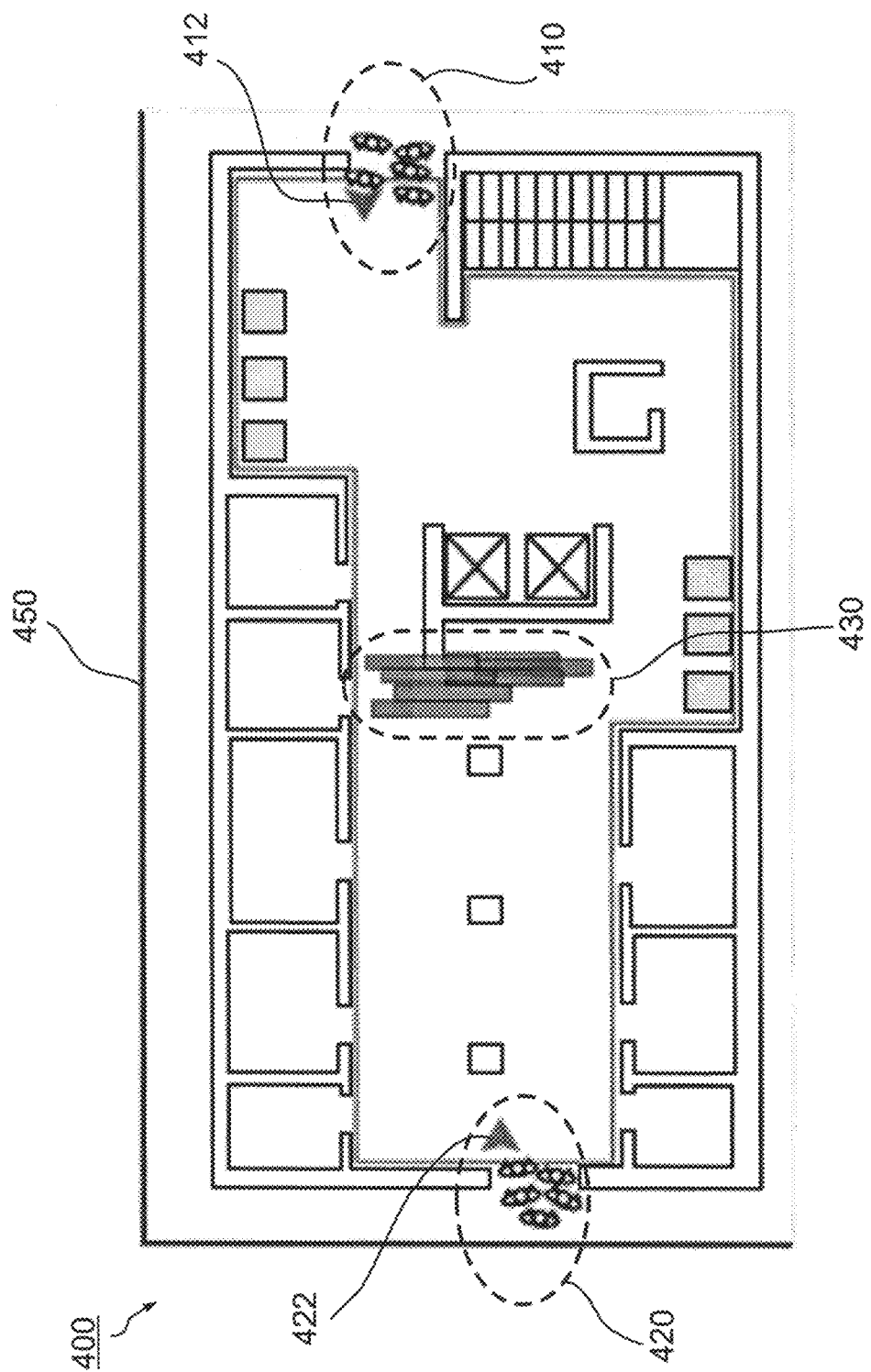
FIG. 4 depicts another exemplary user interface for visualization of ergonomic impact of manipulation of a design feature on navigational capability of simulated digital users according to some embodiments of the invention.

FIGS. 3A, 3B and 4 depict exemplary fast feedback user interfaces according to various embodiments of the invention.

FIG. 3A depicts an interface 300 in which a design professional can manipulate a physical attribute (e.g. size) of an object (depicted as window) in a model space (depicted as building 310). In the depicted interface 300, output 334 (e.g., 334A and 334B) is provided as a graph of temperature within building 310 as a function of time superimposed on a comfort zone depicted as a white band with a median temperature of 25 degrees. In the depicted exemplary embodiment of the invention, as window 320 is resized from Size "A" to size "B", for example by corner 322, output 334A changes to 334B. In an exemplary embodiment of the invention, the change from output 334A to 334B is substantially immediate. Optionally, substantially immediate effect on output 334 contributes to an ability of the design professional to optimize between aesthetic consideration (e.g. window size) and economic considerations (e.g. heating/cooling costs). Although a single object is depicted for clarity, a typical exemplary embodiment of a user interface could include a much larger number of manipulatable objects.

In an exemplary embodiment of the invention, at least a low quality response is provided in an interactive manner, for example, being shown and/or updated while an object is being dragged and/or within a screen refresh time, for example, 0.3-1 seconds. Optionally, a higher quality response output is shown when dragging slows down or an object is "released" by an operator. The rate and/or quality of output may depend on processing power locally available. In some embodiments, local processing power (and/or response time) is enhanced by the use of additional computers, for example, one or more stand-alone simulation server, for simulating some or all of the digital users and/or environmental effects.

In an exemplary embodiment of the invention, an inverse configuration is provided in which the design professional adjusts the graph result in output 334 and window 320 is resized in response. Optionally, the user interface suggests several possible configurations of multiple manipulatable objects in response to an entered desired output 334.

FIG. 3B depicts an additional exemplary interface 350 in which a design professional can manipulate a physical attribute (e.g. position) of an object (depicted as column 368) in a model space (depicted as floor plan 360). In the depicted interface 350, output 380 is provided as a graphic representation of density of simulated digital users within floor plan 360. In an exemplary embodiment of the invention, the design professional can move column 368 to different positions (indicated as 362, 364, 366 and 370) and observe an effect on output 380 substantially immediately. Optionally, substantially immediate effect on output 380 contributes to an ability of the design professional to optimize between ergonomic consideration (e.g. user density) and structural considerations (e.g. appropriate ceiling support).

In an exemplary embodiment of the invention, an inverse configuration is provided in which the design professional adjusts output 380 and an optimized location for column 368 is suggested by the interface. Output 380 is a density map showing densities of digital users during a simulation as a gradient, with darker grey indicating higher population density. Optionally, an average density parameter for the entire area (e.g. measured in users per square meter) is calculated concurrently. In some embodiments of the invention, a user inputs population density data and output is provided as a floor plan 360 indicating an optimum object (e.g. column) position (e.g. 362, 364, 366, 368 or 370).

FIG. 4 depicts an interface 400 in which a design professional can manipulate a physical attribute (e.g. position) of an object (depicted as information desk 430; grey rectangles indicating different positions) in a model space (depicted as floor plan 450) and evaluate response of simulated digital users 410 and/or 420 entering via entrances 422 and/or 412 as indicated by average time to arrive at the information desk and/or by number of simulated digital users that reach the information desk within a pre-set time limit (e.g. 1 minute).

According to the depicted embodiment, each time that information desk 430 is moved to a new position, one or more simulations in which all simulated digital users 410 and/or 420 enter via entrances 422 and/or 412 is conducted. Evaluation of the simulations can be conducted as described hereinabove in the context of method 1700 and/or apparatus 1800.

Exemplary Causative Attributes

Figure 5:
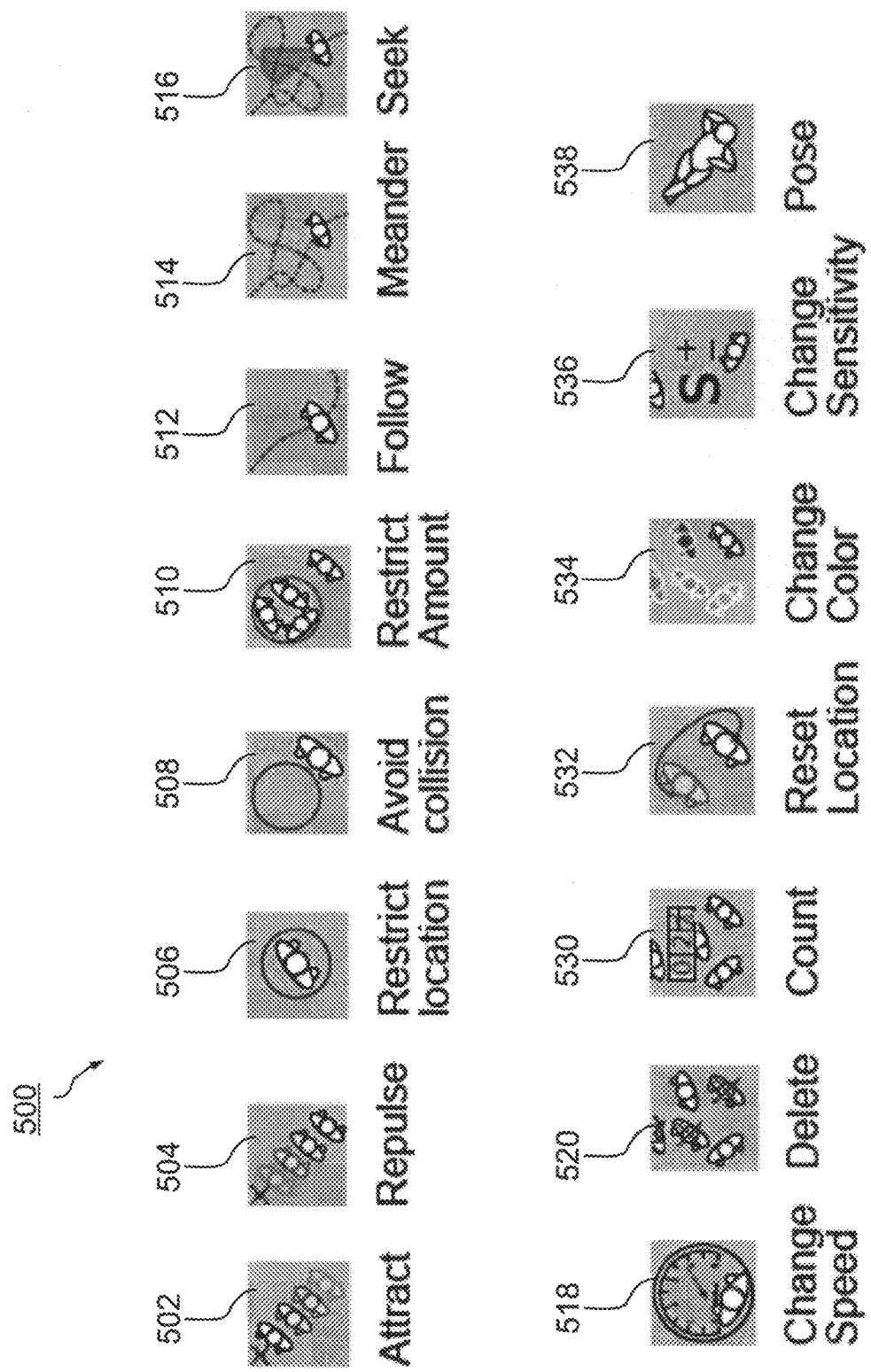
FIG. 5 depicts a series of exemplary icons representing attributes according to exemplary embodiments of the invention.

FIG. 5 depicts an exemplary set 500 of icons indicating causative, or affective, attributes. Optionally, causative attributes can be assigned to simulated digital users and/or to objects in a model. In an exemplary embodiment of the invention, a specific causative attribute of an object may be relevant only to a portion of a population of simulated digital users.

In an exemplary embodiment of the invention, each causative attribute can be set, or programmed, using an appropriate user interface. Optionally, the user interface is a graphic interface (e.g. a dialog box). Setting or programming can include use of one or more of check boxes, radio buttons, pull-down menus, slider bars, arrow buttons and data entry fields. Optionally, an exact input mode can vary from attribute to attribute.

In an exemplary embodiment of the invention, groups or sub-populations of simulated digital users and/or objects are set and/or programmed with regard to one or more causative attributes. Optionally, designations of attributes to sub-populations can be applied as nested hierarchies or applied as independent variables as described hereinabove in the context of method 1700.

Exemplary causative attributes, one or more of which may be provided, include, but are not limited to:

Attract 502: The attract attribute specifies a power of attraction. Attract can be defined in terms of distance (e.g. effective up to 5 meters) and/or strength (e.g. weak, intermediate or strong) and/or specificity (e.g. limited to a certain sub-population) and/or probability (e.g. active only a certain percentage of the time or effective only on a certain percentage of a defined sub-population). Simulated digital users respond to attract by moving towards the object or user with the attract attribute.

Repulse 504: This attribute is similar to attract except that simulated digital users respond to repulse by moving away from the object or user with the repulse attribute.

Restrict location 506: The restrict location attribute specifies an area (e.g. a circle, oval or square) to which one or more specific digital users are confined in a model space. Input can be, for example in terms of shape and/or one or more dimensions. This attribute can be useful, for example, in defining positions for security personnel in a model of a public space.

Avoid collision 508: The avoid collision attribute can be defined as collision spheres relative to the digital user which report potential collision events with objects and/or people and allows the simulated digital user to react and navigate around obstacles on time. Input can be, for example in terms of size and/or size as a function of velocity. Alternatively, or additionally, collision avoidance can be implemented as a navigation solver which maps the location of all objects and/or simulated digital users in the model and manages collisions on an ongoing basis.

Restrict amount 510: The restrict amount attribute can be implemented to provide conditional access based upon occupancy. Input can be, for example in terms of shape of a space and/or one or more dimensions of the space and/or number of permitted occupants in the space and/or instructions for what to do when a maximum occupancy is exceeded. When a maximum number of permitted simulated digital users occupy the space, simulated digital users approaching the defined space are not permitted to enter. Optionally, the restrict amount attribute provides alternate instruction for cases where entry is not permitted. Alternate instruction might include, but are not limited to, "proceed to next task" or "wait until possible to enter". Optionally, when the number of simulated digital users occupying the space decreases, a simulated digital user approaching, or waiting near, the defined space is permitted to enter.

Follow 512: The follow attribute can be applied to one or more simulated digital users and can optionally define a sup-population. Optionally, a simulated digital user can be programmed to follow one or more other simulated digital users (e.g. a tour guide or usher) and/or to follow signage as described hereinabove.

Meander 514: The meander attribute can be applied to one or more simulated digital users in order to use available time prior to and/or during pursuit of a programmed activity and/or to add randomness to behavior of a population. In an exemplary embodiment of the invention, meander 514 considers available time for the programmed activity and/or estimates an amount of excess time available. Input can be, for example, in terms of a definition of an area in which the meandering is to occur and/or one or more secondary activities to be engaged in during meandering (e.g. window shopping, purchases, conversation and smoking), an amount of time between direction changes, a distance between direction changes (e.g. average distance and/or minimum distance and/or maximum distance), visibility of attractive objects and/or attractive simulated digital users, and an angular correction for direction changes. Optionally, the meander attribute employs random number generators to create pseudo random behavior. In an exemplary embodiment of the invention, the meander attribute is applied at intervals of time (e.g. fixed or variable) to members of a population and/or sub-population to cause them to circulate.

In an exemplary embodiment of the invention one, two or three random number generators are used to define meander behavior. Optionally, a first random number generator selects an angular correction for the simulated digital user (e.g. 0-360 degrees or +180 degrees to −180 degrees or a smaller range) to generate a setting. Optionally, a second random number generator selects a velocity to be used by the same simulated digital user along the setting (e.g. slow walk, brisk walk, trot or run) to create a velocity vector. Optionally, a third random number generator selects a duration (e.g. total distance or total time) for which the same simulated digital user moves according to the velocity vector. In an exemplary embodiment of the invention, a large number of simulated digital users are each set by the same set of random number generators so that each simulated digital user moves in an apparently random fashion. Optionally, this type of programming causes a population or sub population to exhibit pseudo random behavior. In an exemplary embodiment of the invention, the meandering can be directed. For example, arriving passengers converging on a train platform may be made to converge upon the platform while meandering. Convergence can be achieved, for example, by limiting an available range of angular correction in the first random number generator (e.g. to ±60 degrees). Optionally, available range of angular correction can be successively restricted with each correction (e.g. to ±60; ±30, ±15, +5 degrees) as the users approach the platform.

Seek 516: The seek attribute can be applied to one or more simulated digital users and can optionally define a sup-population. Simulated digital users programmed to seek an object optionally use simulated vision and/or follow signage to seek a defined object. In an exemplary embodiment of the invention, seek is programmed in addition to directional and/or velocity instructions. In an exemplary embodiment of the invention, a group of simulated digital users programmed to seek a common object are additionally programmed to enter the space from different points. For example football spectators with tickets in section 612 might be programmed to "seek section 612" according to visible signage and/or instructions from ushers with 30% of spectators with tickets in section 612 entering from gate E and 70% of spectators with tickets in section 612 entering from gate F.

Change speed 518: The change speed attribute can be applied either independently or as a conditional command. Exemplary inputs for change speed include a velocity prior to the change and/or a velocity after the change and/or one or more criteria for evaluating when to make the change. Optionally, criteria for evaluating when to make the change include an amount of time remaining to an event and/or a distance to a goal. For example an exemplary change speed criteria can include a criteria "IF more than thirty meters from departure gate one minute prior to departure; THEN begin to run."

Exemplary Reactive Attributes

FIG. 5 also depicts exemplary attributes which enable simulated digital users to react to different simulated situations, one or more of which are optionally provided:

Delete 520: The delete attribute is used to remove simulated digital users from the simulation. For example, simulated digital users may be deleted when they cross a border to an area outside of a model space (e.g. pass through an exit) and/or when they complete a programmed activity (e.g. arrive at an assigned seat).

Count 530: The count attribute is used to gather information on how many simulated users pass a specified place (e.g. point, line or zone border) and/or are viewed in a specified place by one or more other simulated digital users (e.g. security personnel or ushers). Data acquired by the count attribute can be use by an evaluation module (e.g. evaluation module 1850) and/or a reporting module (e.g. reporting module 1870), for example in compiling a summary (e.g. summary 1880). Optionally, counting may be associated with an object in a design (e.g. a turnstile, door or gate).

Reset Location 532: The reset location attribute can be used to recycle simulated digital users. In some exemplary embodiments of the invention, simulations are presented as repeating loops. Optionally, a simulated digital user leaving a model space at a first point is reset to enter the model space at a second point. For example a simulation of a shopping mall concourse might include two sub-populations of simulated digital users:

Set A programmed to meander 514 from southern doors to northern doors; and

Set B programmed to meander 514 from northern doors to southern doors.

In this exemplary simulation, Set A simulated digital users can be programmed using reset location 532 to re-enter from southern doors after exiting from northern doors and Set B simulated digital users can be programmed using reset location 532 to re-enter from northern doors after exiting from southern doors.

Change color 534: The change color attribute can be used to indicate a condition and/or a sub-population membership of a simulated digital user.

In some exemplary embodiments of the invention, a design professional indicates, using change color 534, a color for each simulated digital user based upon a sub-population membership (e.g. arriving passengers in a transportation terminal indicated as blue and departing passengers indicated as yellow). Optionally, this color based identification of sub populations contributes to ease of comprehension of a simulation presented as an animated graphic animation sequence.

Alternatively, or additionally, in some exemplary embodiments of the invention, a design professional indicates programs, using change color 534, each simulated digital user to respond to an environmental condition with a color change. Optionally, this color change contributes to ease of comprehension of an environmental impact on simulated digital users in a simulation presented as an animated graphic animation sequence. For example, in a simulation in which all simulated digital users are grey, the change color 534 attribute can be used to program users to react to temperatures above 24 degrees centigrade by turning progressively more red (e.g. 25 degrees light pink, 26 degrees medium pink, 27 degrees dark pink, 28 degrees red and 29 degrees or more flashing red). In an exemplary embodiment of the invention, this approach allows presentation of environmental data concurrently with ergonomic data in a single simulation.

Change sensitivity 536: The change sensitivity attribute can be used to indicate a sensitivity and/or a change in a change in sensitivity of one or more simulated digital users to a causative attribute.

In some exemplary embodiments of the invention, change sensitivity can be applied to a second object so that changes a sensitivity of a sub-population to a first object. For example, passengers in a transportation terminal are split into two sub-populations: (15%) hungry and (85%) non-hungry. The members of the hungry sub-population are nominally attracted to a food kiosk. Application of change sensitivity 536 to a sign indicating "food kiosk closed for remodeling" enable the sigh to change sensitivity of simulated digital users that see the sign from "sensitive" to "insensitive" with respect to the closed kiosk. These passengers optionally remain sensitive to vending machines which sell food items.

Optionally, change sensitivity 536 is used to implement time constraints. For example, members of the hungry sub-population can be programmed to stop seeking food 7 minutes before scheduled departure of their train, even if they have not yet eaten. This type of programming can produce realistic behavior such as beginning to wait in a queue to buy food and then leaving the queue to run to a platform to catch a train.

Pose 538: The pose attribute can be used to indicate a posture or position of one or more simulated digital. Optionally, pose 538 uses predefined postures (e.g. stand, lean, sit, walk and run). Alternatively, or additionally, each pose can be characterized by a direction and/or a duration (e.g. sit facing target, stand facing in a direction of a queue or walk for thirty seconds). In an exemplary embodiment of the invention, a pose of one or more simulated digital users is visually perceived by one or more other simulated digital users. In an exemplary embodiment of the invention, perceived poses of one or more simulated digital users influence behavior of one or more other simulated digital users.

Exemplary Use Scenario

Figure 6:
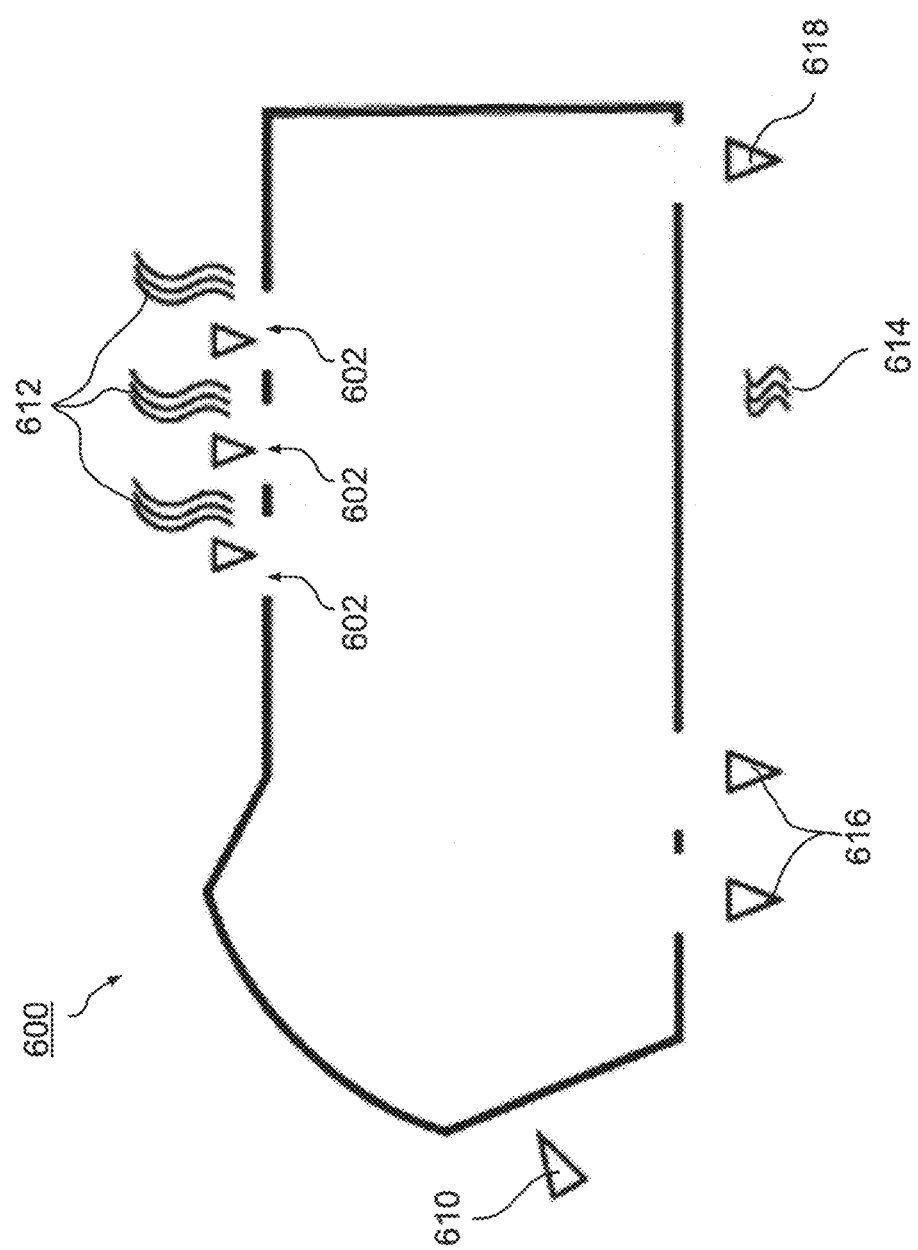
FIG. 6 is a plan view of a space illustrating environmental and design features according to an exemplary embodiment of the invention.

FIG. 6 is a plan view 600 of an airport arrival hall space illustrating environmental features (e.g. air conditioned environment 612 in an adjoining hall and hot external environment 614 and prevailing wind direction 610) and design features (e.g. external access doors 616 and 618 and doors 602 to the adjoining hall according to an exemplary embodiment of the invention.

Figure 7:
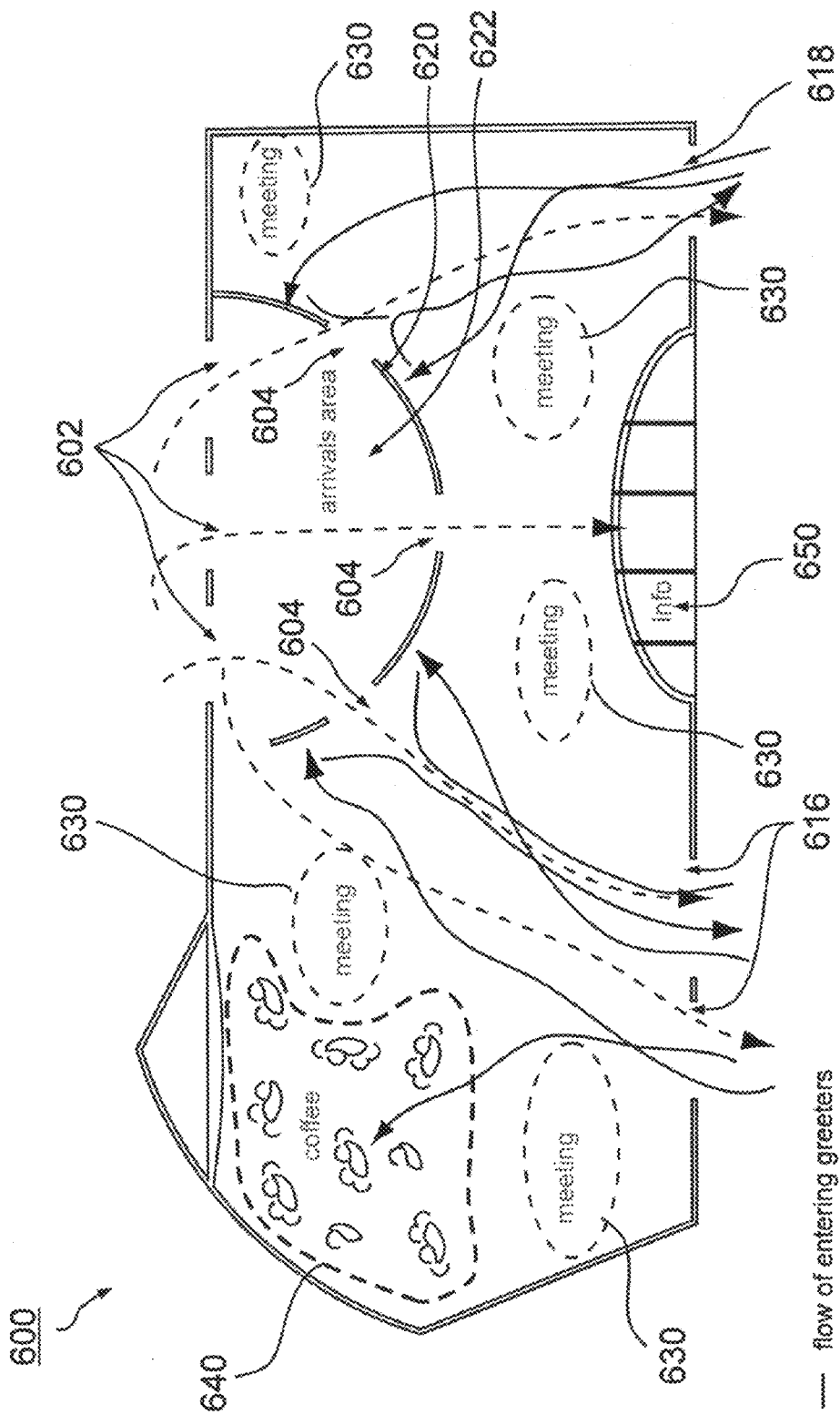
FIG. 7 is a plan view of a space as ion FIG. 6 with additional features added.

FIG. 7 is the plan view 600 of the space depicted in FIG. 6 with additional features added. In FIG. 7 a curved barrier 620 has been added to delimit an arrival area 622 in which arriving passengers entering via doors 602 are separated from waiting greeters. According to the depicted exemplary design, arriving passengers will exit arrival area 622 via openings 604 in barrier 620. Meeting areas 630 are designated as functional bubbles for interaction between arriving passengers and greeters. An additional functional bubble 640 encloses tables in a refreshment area. A service desk 650 with a semicircular configuration is positioned directly opposite curved barrier 620 in the depicted preliminary design. Dotted arrows depict projected paths of arriving passengers (dotted line arrows) and greeters (continuous line arrows).

Figure 8:
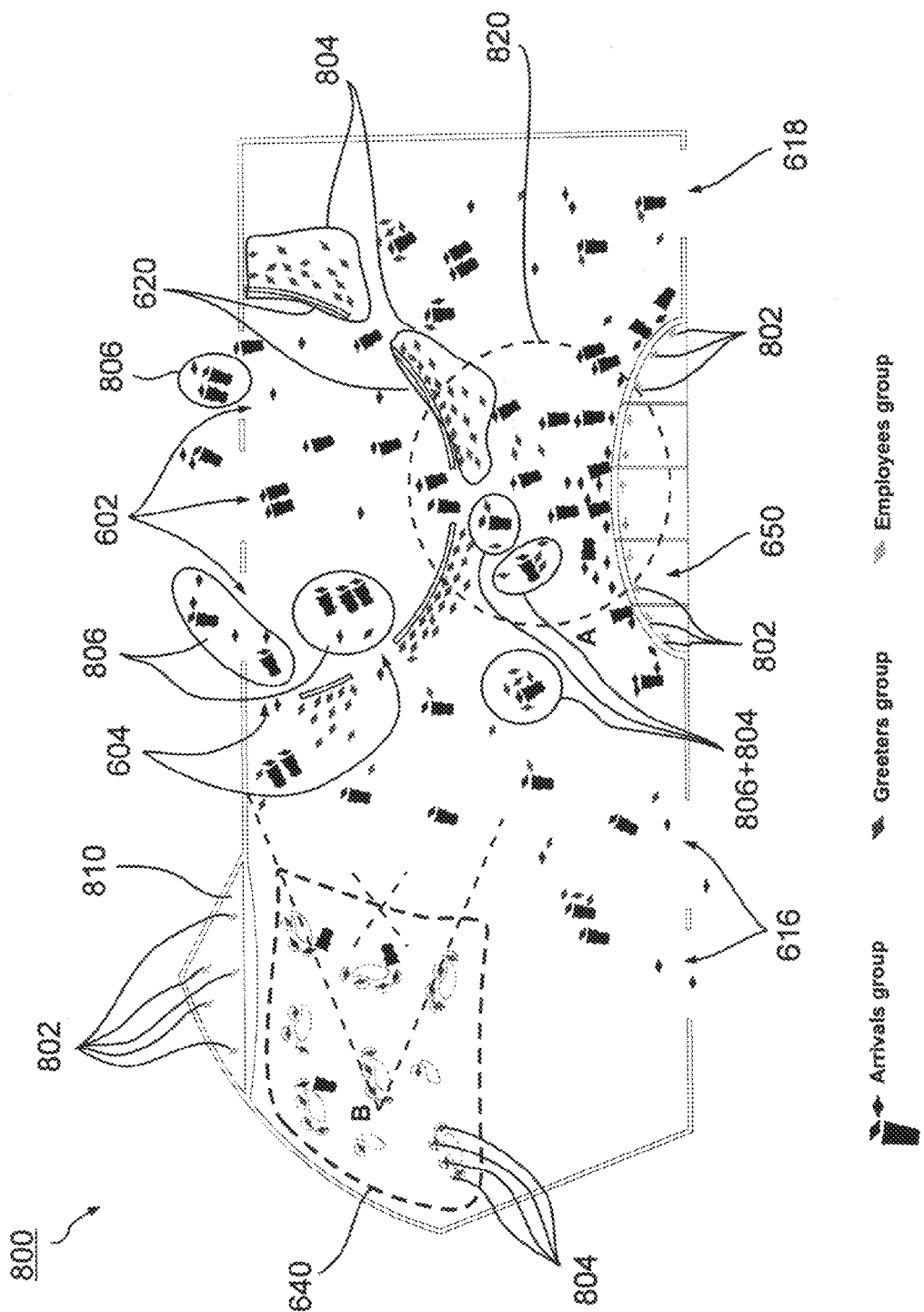
FIG. 8 is a plan view of a space as ion FIG. 7 depicting a population of simulated users in the space according to an exemplary embodiment of the invention.

FIG. 8 is a still frame from an animated graphic simulation 800 being run in the plan view 600 of FIG. 7. The still frame depicts a population of simulated digital users in the space according to an exemplary embodiment of the invention. In the depicted exemplary embodiment the population of simulated users is divided into three subpopulations: arriving passengers 806 (in top view in Black, some depicted pushing trapezoidal luggage carts), greeters 804 (in top view as Gray) and employees 802 (top view as Light Gray).

In the depicted simulation each of the sub-populations is seen to move around and/or through the arrivals hall. In the depicted animated graphic simulation, arriving passengers 806 are seen entering via doors 602 and passing through openings 604 in curved barrier 620.

Depending on how each arriving passenger 806 has been programmed, they may either proceed directly to exits 616 or 618 or visit service desk 650 (e.g. to ask for information and/or rent a car and/or change money and/or purchase ground transportation (e.g. bus or train) tickets) or meet one or more of greeters 804.

Greeters 804 can be seen together with arriving passengers 806 (In the interest of clarity only a few representative meetings are indicated as 806+804), or in refreshment area bubble 640 or clustered at an outer edge of curved barrier 620.

In the depicted exemplary embodiment, employees are depicted at service desk 650 and in service area (e.g. refreshment counter) 810.

In an exemplary embodiment of the invention, a design professional reviewing the simulation might identify crowding of greeters 804 at curved barrier 620 and/or crowding between curved barrier 620 and service desk 650 as problematic. Alternatively, or additionally, the design professional reviewing the simulation might identify sight lines for greeters 804 seated in refreshment area bubble 640 as problematic. Alternatively, or additionally, problems might be identified automatically, for example by evaluation module 1850 (FIG. 2C).

In an exemplary embodiment of the invention, the design professional attempts to change one or more design inputs, optionally in the form of objects, to correct identified problems. In an exemplary embodiment of the invention, one or more subsequent simulations with the same population of users can be used to evaluate an effect of changes in design inputs.

FIGS. 9 and 10 illustrates implementation of modifications to physical design 900 by changing selected features of the space depicted in FIGS. 6-8 in response to observations of the population of simulated users according to an exemplary embodiment of the invention. In an exemplary embodiment of the invention, implemented changes (e.g. by a design professional) produce modified design 1000.

In the depicted example, changes include repositioning and re-shaping of refreshment service desk 810 to modified refreshment service desk 1010 to allow a different spread of refreshment area bubble 640 for better views of the arrivals in arrival area within barrier 620

In the depicted example, the changes also include repositioning and re-shaping of curved barrier 620 and information desk 650 to create modified barrier 1020 with openings 1004 and modified service desk 1050. As a result of the depicted re-shaping, distance between the barrier and the service desk is increased. These changes are implemented in an attempt to address crowding issues described hereinabove.

In the depicted example, the changes also include repositioning and re-shaping of refreshment area bubble 640 to modified refreshment area bubble 1040. Modified refreshment area bubble 1040 offers improved sightlines to curved barrier 1020 relative to original bubble 640 relative to barrier 620.

Figure 11:
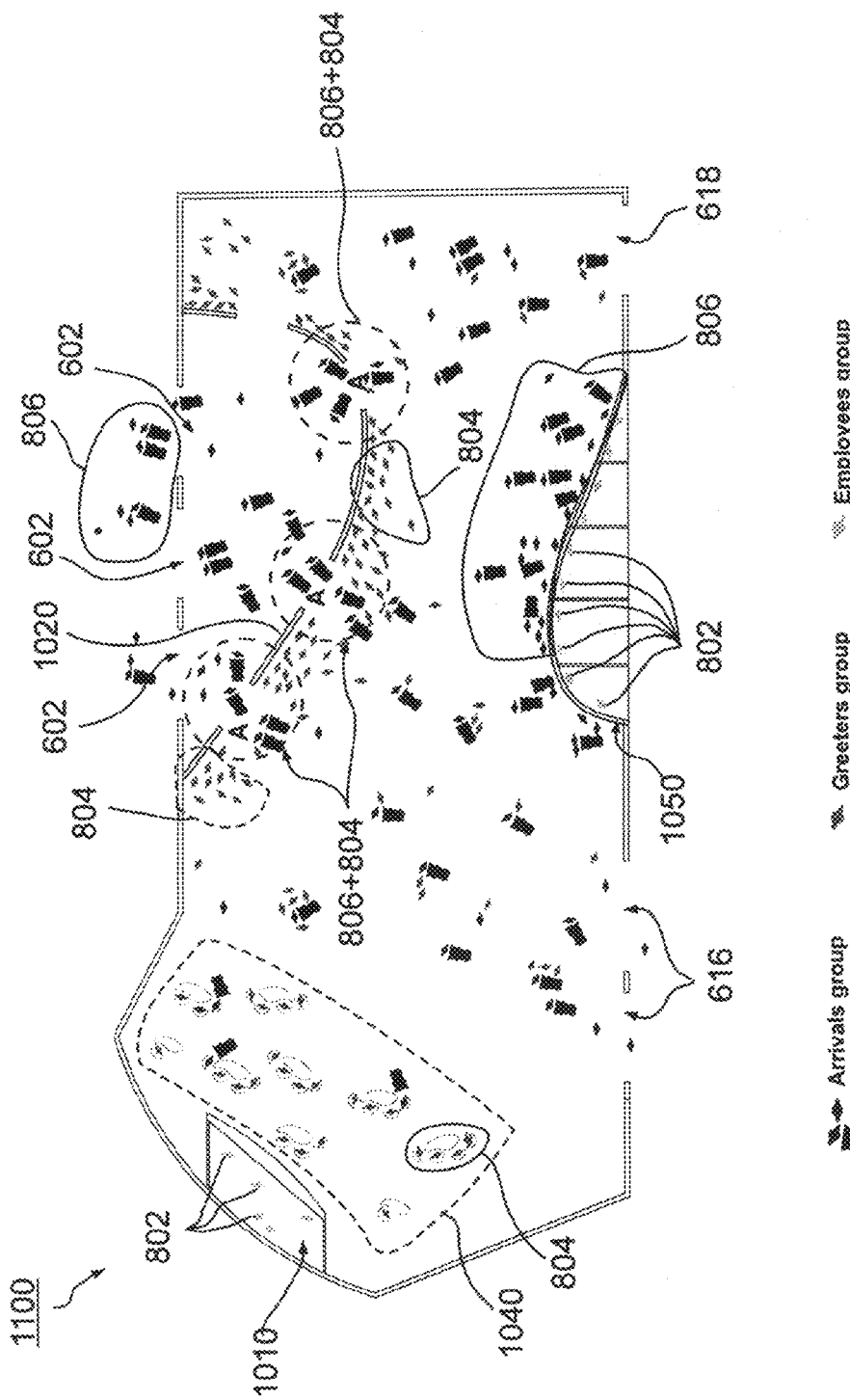
FIG. 11 illustrates use of the modified space of FIG. 10 by the population of simulated users of FIG. 8 according to an exemplary embodiment of the invention.

FIG. 11 is a still frame 1100 of an animated graphic simulation conducted in the modified space of FIG. 10 with the population of simulated users of FIG. 8 according to an exemplary embodiment of the invention. In an exemplary embodiment of the invention, results of this simulation are used to evaluate design changes implemented in FIG. 10.

Depicted exemplary results indicate that modified refreshment service area 1010 and modified bubble 1040 are satisfactory. In addition, congestion in front of modified service desk 1050 has been relieved and a large number of arriving passengers 806 are being served by employees 802.

However, the new simulation indicates that crowds of greeters 804 along modified curved barrier 1020 remain a problem. In addition, meetings of arriving passengers 806 and greeters 804 in openings in barrier 1020 (indicated as dotted circles with A at center) cause congestion at those openings.

Figure 12:
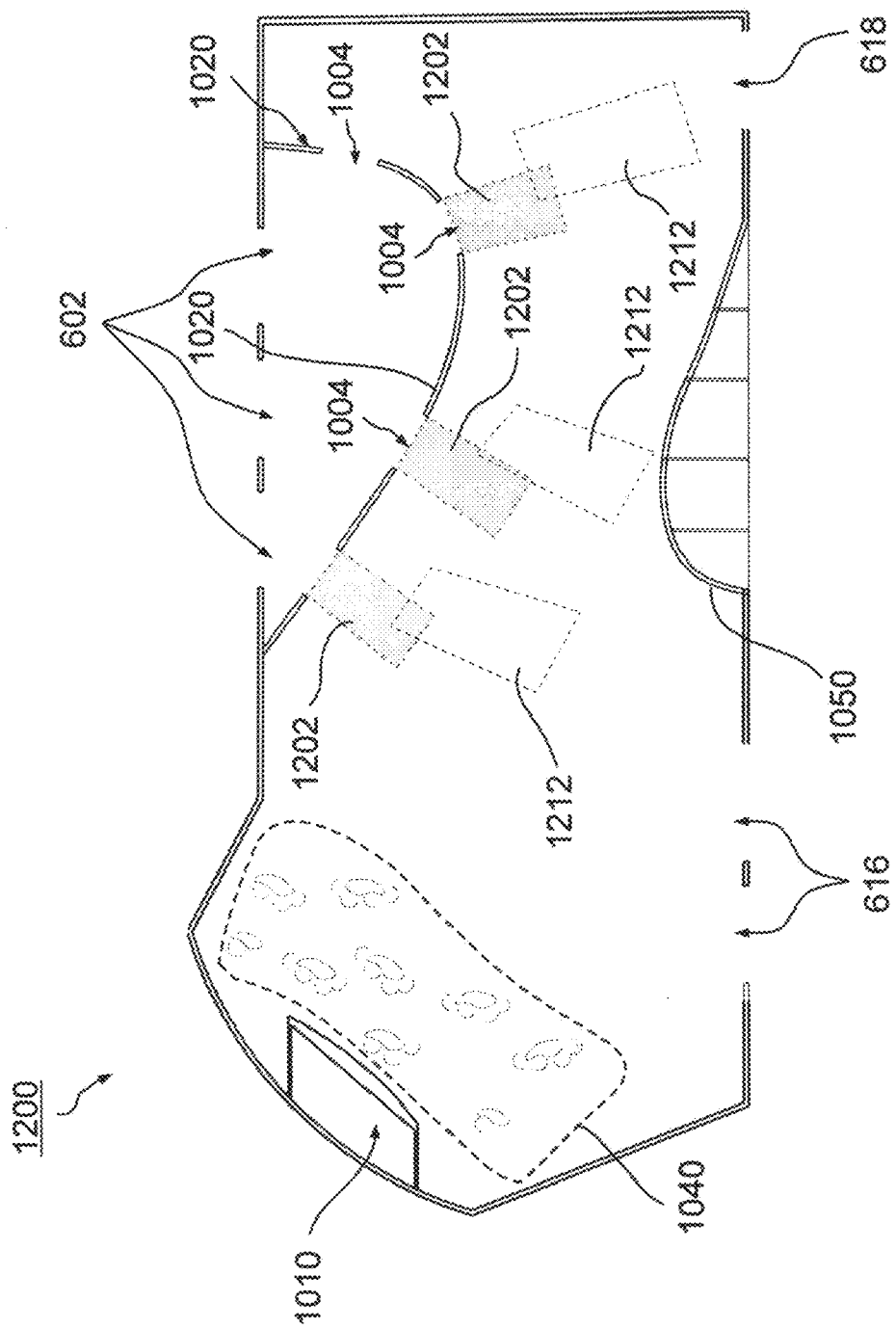
FIG. 12 is a plan view of the space depicted in FIG. 11 illustrating implementation of environmental changes to influence behavior of the population of simulated users according to an exemplary embodiment of the invention.

FIG. 12 is a plan view 1200 of the space depicted in FIG. 11 illustrating implementation of environmental changes to influence behavior of the population of simulated users according to an exemplary embodiment of the invention. Plan view 1200 depicts skylights 1212 in the ceiling. Optionally, conventional glazing in skylights 1212 means that incoming light creates corresponding areas of direct sunlight 1202 which are aligned with openings 1004 in modified barrier 1020. In an exemplary embodiment of the invention, areas of direct sunlight 1202 aligned with openings 1004 discourage simulated digital users from remaining in the openings.

In an exemplary embodiment of the invention, a design professional inputs areas on the floor to be lit with direct sunlight and corresponding skylights are proposed. In an exemplary embodiment of the invention, this exemplary interface operates on an apparatus as described in the context of method 1900 and/or apparatus 2000. Optionally, method 1900 and/or apparatus 2000 consider longitude and/or latitude and/or time of day and/or season of year when calculating a correspondence between areas of direct sunlight 1202 and skylights 1212.

Figure 13:
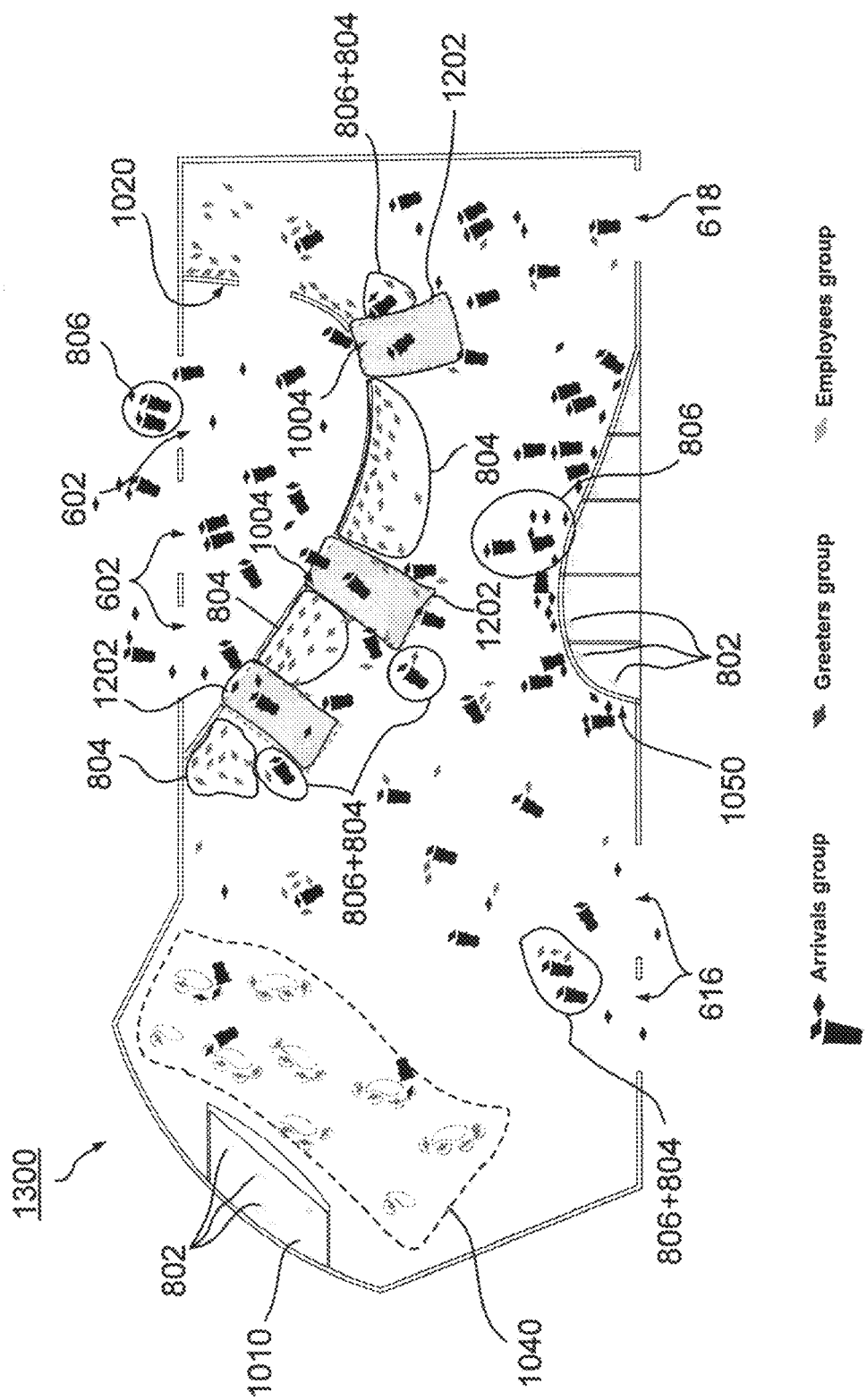
FIG. 13 is a plan view of the space including the environmental modifications depicted in FIG. 12 illustrating effect of the environmental changes on behavior of the population of simulated users according to an exemplary embodiment of the invention.

FIG. 13 is a still frame 1300 of an animated graphic simulation conducted in the modified space of FIG. 12 with the population of simulated users of FIGS. 8 and 11 illustrating effect of the environmental changes on behavior of the population of simulated users according to an exemplary embodiment of the invention. The depicted still frame indicates that alignment of areas of direct sunlight 1202 with openings 1004 in modified barrier 1020 is effective in keeping simulated digital users from clogging the openings.

Figure 14:
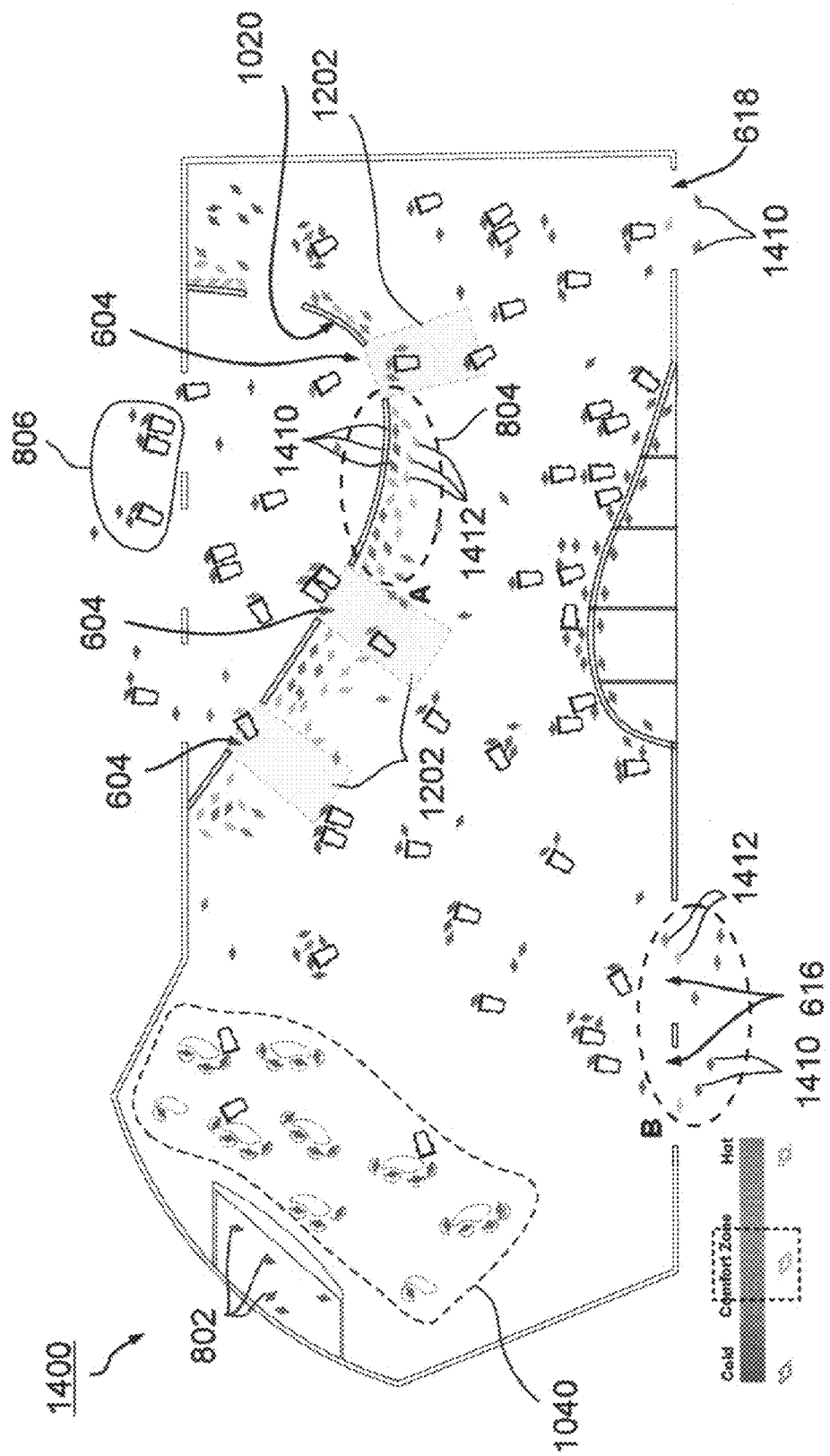
FIG. 14 is similar to FIG. 13 and depicts use of simulated users as temperature indicators according to an exemplary embodiment of the invention.

FIG. 14 is similar to FIG. 13 except that it depicts use of simulated digital users as temperature indicators according to an exemplary embodiment of the invention. In FIG. 14, simulated digital users depicted as green are comfortable (e.g. perceived temperature of 22 degrees or less), those depicted as yellow 1412 are moderately warm (e.g. perceived temperature of 23 to 26 degrees centigrade) and those depicted as red 1410 are uncomfortably warm (e.g. perceived temperature of 27 degrees or more). In an exemplary embodiment of the invention, use of simulated digital users as temperature gauges is used to reveal problems of internal gain. Optionally, perceived temperature considers actual ambient temperature and/or airflow and/or exposure time.

In the depicted exemplary embodiment, over crowding of greeters at modified curved barrier 1020 contributes to internal gain which can make them uncomfortably warm if they remain too long in the densely populated area.

Alternatively, or additionally, simulated users outside of exits 616 (indicated by dotted oval marked B) and/or 618 are depicted as uncomfortably warm 1410, suffering from a thermal shock in the transition from the cool A/C interior to the hot exterior.

In an exemplary embodiment of the invention, simulated digital users proceeding rapidly through areas of direct sunlight 1202 remain comfortable to moderately warm so long as they do not remain in areas 1202 for too long.

FIG. 14 depicts use of an environmental zone as an object with causative attributes relative to one or more simulated digital users. Optionally, use of simulated digital users as temperature indicators highlights environmental design problems.

Figure 15:
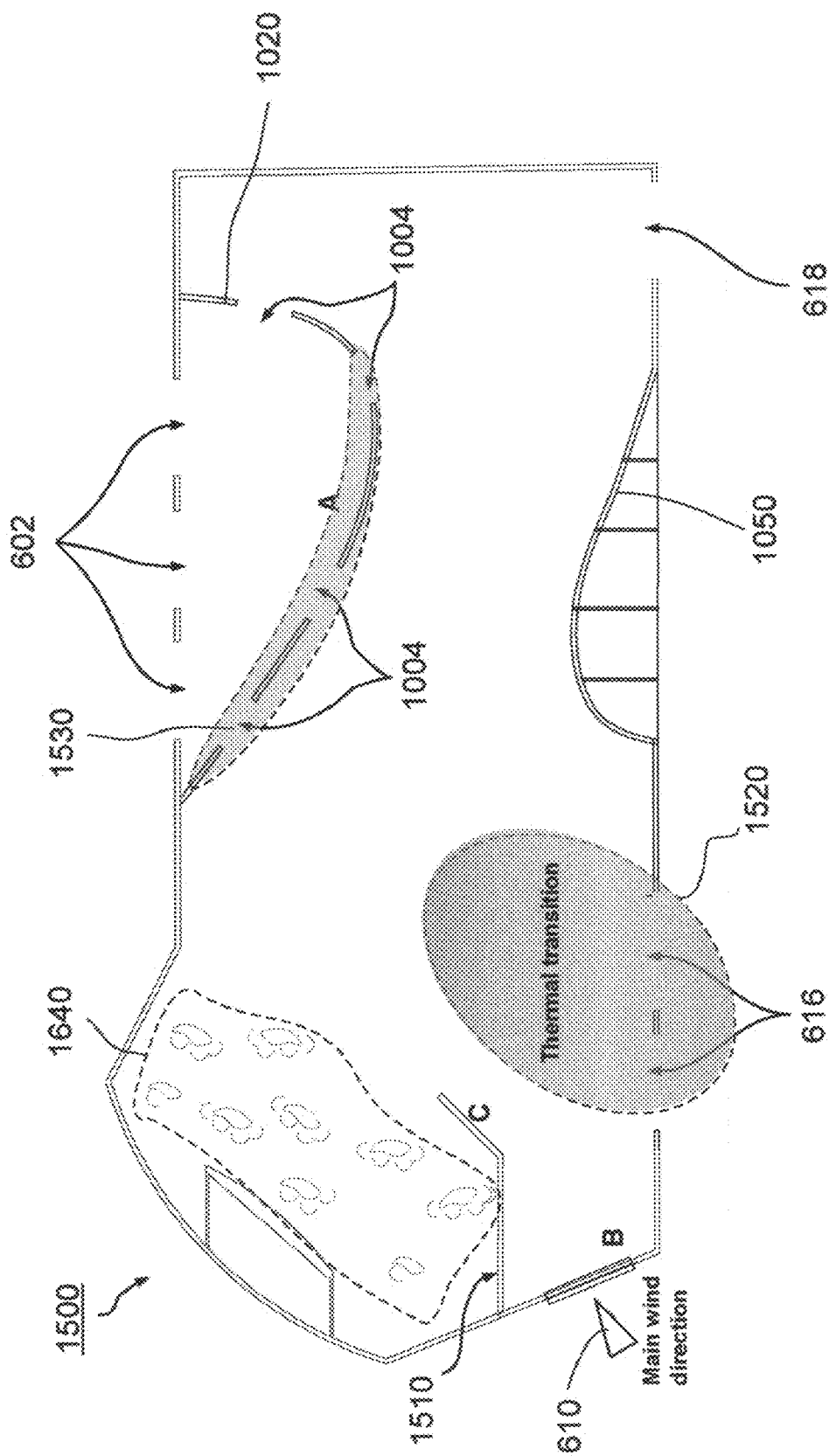
FIG. 15 is similar to FIG. 12 and depicts graphic display of thermal transition zones as well as additional design features implemented to control temperature distribution within the space according to an exemplary embodiment of the invention.

FIG. 15 is a plan view 1500 depicting thermal zones graphically as well as depicting additional design features implemented to control and/or mediate temperature distribution within the space according to an exemplary embodiment of the invention. In FIG. 15 zone 1530 depicts augmentation of air conditioning along modified curved barrier 1020. The augmentation is provided to remedy the uncomfortably warm (1410) condition of greeters along the barrier depicted in FIG. 14. In addition, a new opening B is added allowing flow of warm wind from main wind direction 610 to enter the space and together with warm air entering through exit doors 616 create thermal transition zone 1520 which change temperatures indoors creating a buffer temperature zone reducing thermal shock experienced when exiting via exits 616. In the depicted exemplary embodiment, a partition 1510 has been added to reduce an effect of this warm air on refreshment area bubble 1040 creating modified bubble 1640.

Figure 16:
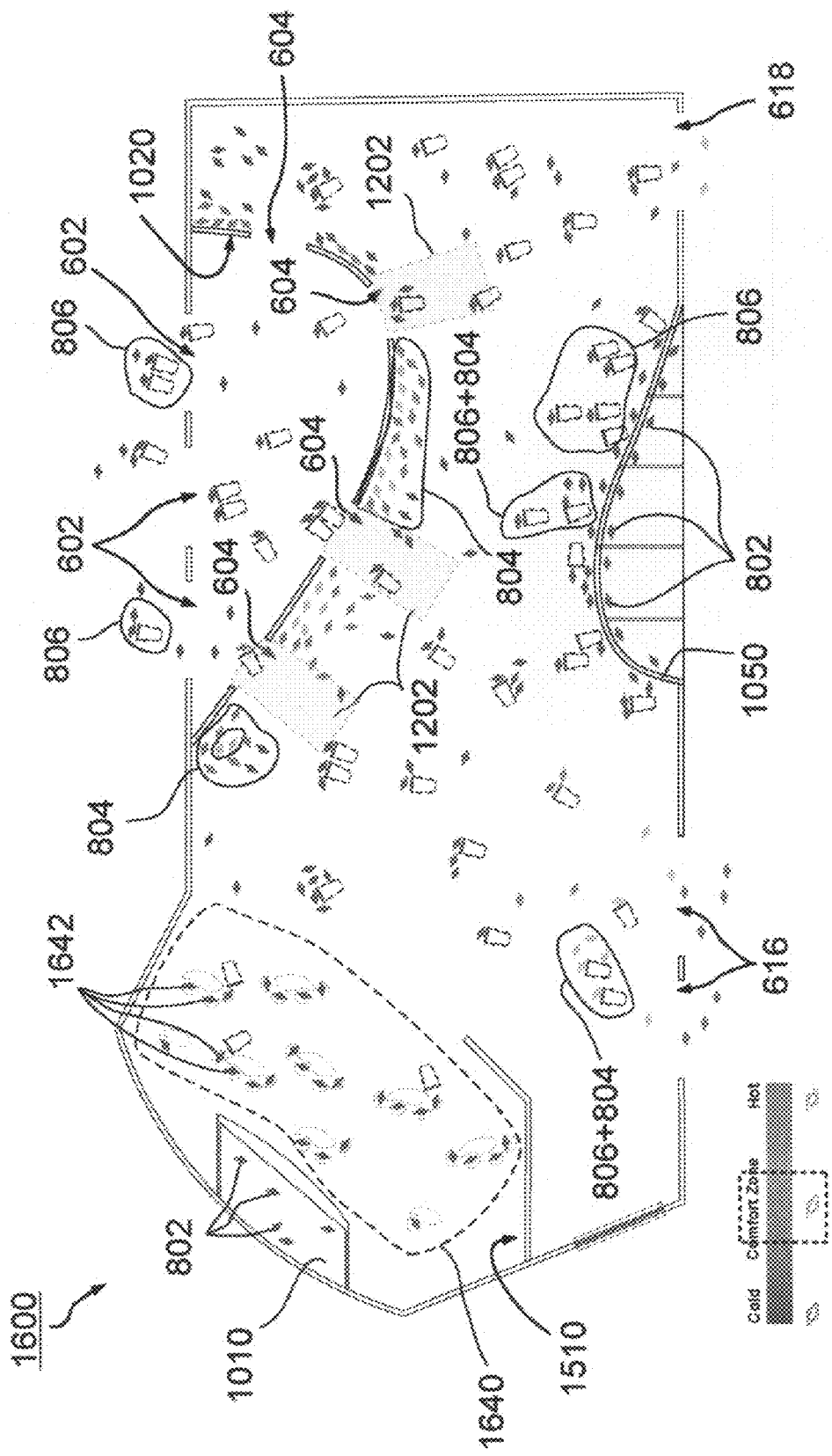
FIG. 16 depicts the additional design features of FIG. 15 together with use of simulated users as temperature indicators as in FIG. 14 according to an exemplary embodiment of the invention.

FIG. 16 is a still frame 1600 of an animated graphic simulation conducted in the modified space of FIG. 15 with the population of simulated users of FIGS. 8, 11 and 14. FIG. 16 illustrates that augmented air conditioning zone 1530 relieves overheating of simulated users along barrier 1020. Alternatively, or additionally, simulated users exiting from exits 616 experience gradual change in temperature, rather than a sudden thermal shock because of warm air entering via new opening B. Alternatively, or additionally, simulated users 1642 in refreshment area 1640 are protected from an influence of warm air entering via new opening B by partition 1510.

Exemplary Inputs

In an exemplary embodiment of the invention an input module 1810 and/or 2010 is configured to accept definitions of the objects in terms of one or more object parameters. Object parameters can include inherent attributes and/or causative attributes.

In an exemplary embodiment of the invention, at least some, if not all inherent attributes are defined in any case even if no simulation is performed and only a 3D model is constructed these attributes exist. Exemplary inherent object attributes include, but are not limited to, size, position, color, distance from other objects, function (e.g. a door permits passage while a wall does not permit passage) and material properties (e.g. degree of opacity, thermal properties and acoustic properties).

In an exemplary embodiment of the invention, causative attributes are attributes that are only defined for the purpose of simulation. Some attributes may be defined in terms of time (e.g. the time a digital user will spend at a certain destination/in a certain object). Some attributes may be defined in terms of distance (e.g., only at a certain distance from an object will the digital user become attracted to it). Some attributes may be define din terms of Degree of visibility (e.g., only if a user saw the sign for a shop (or any defined part of it) he will follow it into the shop).

Exemplary causative object attributes include, but are not limited to attract, change speed, restrict location (absolute or temporally restricted) and limit amount.

According to various embodiments of the invention, parameters such as degree of visibility, distance and size are defined in terms of length and/or width and/or height and/or thickness.

Optionally or alternatively to absolute defining of values of inherent qualities (e.g., acoustic reflection, heating), some such values may be derived from other inherent properties. For example, heating effect from size and heat per unit data. In other examples, size characteristics can contribute to one or more of acoustic characteristics (e.g. sound conducting or insulating properties), thermal characteristics (e.g. heat conducting and/or reflecting and/or insulating properties) and visibility characteristics (e.g. a degree of visibility and/or obstruction of a line of sight).

In an exemplary embodiment of the invention, the input module is configured to accept definitions of the objects in terms of a zone defined as one or more parameters representing a defined environmental condition. Optionally, the parameters representing a defined environmental condition include one or more of temperature, air flow, temperature gradient, light intensity, type of light, light direction, color, noise level, noise type (e.g. traffic noise, music, conversation or echo) and pollutant concentration (e.g. smoke level, ammonia level).

In an exemplary embodiment of the invention, the input module is configured to accept a change in at least one parameter of the zone as a means of manipulating at least one object in a model.

Exemplary Output Formats

According to various exemplary embodiments of the invention, a simulation can be provided as a finite sequence of events or a continuous loop.

According to various exemplary embodiments of the invention, a simulation can identify one or more of problematic density of simulated users, visibility/readability problems, environmental problems caused by physical design features and ergonomic problems caused by physical design features.

Optionally, problematic density of simulated users can cause internal gain contributing to localized high temperatures or localized zones of high noise intensity. In an exemplary embodiment of the invention, simulated digital users are programmed to change color in response to local user density and/or local temperature and/or local noise intensity.

Optionally, visibility/readability problems can cause simulated users to miss information that should be available to them as part of the simulation. In an exemplary embodiment of the invention, simulated digital users employ virtual vision with a defined cone of vision. In an exemplary embodiment of the invention, the cone of vision is modeled to match a human cone of vision. Optionally, a simulation can be used to evaluate placement of one or more objects in terms of line of sight and/or visibility. In an exemplary embodiment of the invention, a user will perceive an object as visible if a sufficient portion of the object passes through their cone of vision. Optionally, the sufficient portion can be 90, 75, 50, 40, 20, 10, 5 or 1% of the object or greater or intermediate or lesser portions.

In some embodiments of the invention, a large object includes an informative portion and a non-informative portion. Optionally, visibility of the informative portion is important for a simulated digital user to implement an appropriate response. For example, an airport shuttle bus can have a sign above the front window indicating "Long Term Parking Area". This sign may occupy less than one percent of the total area of the front of the bus. The sign is informative and must be substantially completely visible to simulated digital users in order for them to know whether to board the bus. The rest of the front of the bus is non-informative, even if it is fully visible. In this type of exemplary scenario, objects which obstruct even a relatively small portion of the informative portion of the object can be detrimental.

In other exemplary embodiments of the invention, any portion of a relatively large object is informative. For example, a security guard that sees any portion of a person (e.g. a foot or a hand) in a closed area will know that security has been compromised.

In an exemplary embodiment of the invention, a user input for defining an informative portion of an object is provided. Once an informative portion has been defined, visibility can be evaluated with regard to the defined informative portion. Alternatively, or additionally, visibility can be defined in terms of distance and/or angle in addition to unobstructed line of sight.

In an exemplary embodiment of the invention, a simulation output can include zones superimposed on a model design space. Optionally, the zones can comprise environmental zones (e.g. temperature or lighting zones) and/or zones defining bubbles allocated for a specific user function. In some cases a bubble and a zone can coincide (e.g. a non smoking area can be defined functionally and/or in terms of an acceptable smoke concentration in PPM).

In an exemplary embodiment of the invention, a bubble depicts an average path of a user belonging to a sub-population assigned to a same activity bordered by indications of deviation from the average (e.g. standard deviation or S.E.M.).

In some exemplary embodiments of the invention, a simulation output can be presented as one or more still images. Optionally, each still image is presented on a display screen. In an exemplary embodiment of the invention, manipulation of a cursor on the screen can reveal additional information in a technique known as rollover. Optionally, several rollover modes are provided (e.g. temperature, user density and lighting level).

In some exemplary embodiments of the invention, simulations are summarized in summaries (e.g. 1880 and 2080). In an exemplary embodiment of the invention, summaries include numerical data and can be presented as one or more of tables, graphs and statistical analyses. Optionally, statistical analyses can be integrated into graphs or tables (e.g. by inclusion of error bars, standard deviation data, S.E.M. data or indicators of statistical significance).

Optionally, summaries of several simulations reflecting outcome of different design modifications can be summarized in a meta-summary. In an exemplary embodiment of the invention, a meta-summary can indicate an impact (e.g. positive or negative and/or magnitude) of specific design changes and/or an overall impact of each design modification.

For example, design modifications A, B and C might be summarized in a meta-summary with regard to design parameters X, Y and Z as in table 2.

TABLE 2

Exemplary meta-summary of design parameters by design modification

| Parameter | Modification | | |
|---|---|---|---|
| | A | B | C |
| X | +1 | +2 | −1 |
| Y | +2 | 0 | +1 |
| Z | +3 | 0 | 0 |

Exemplary Input Interface

In an exemplary embodiment of the invention, each attribute of a population or sub-population or individual digital user is optionally individually programmable and/or settable through a user interface. Optionally, each attribute (e.g. attributes depicted in FIG. 5) is provided with its own interface. In an exemplary embodiment of the invention, a scenario construction wizard guides a design professional through construction of a scenario based upon input criteria.

Optionally, a scenario creation wizard offers a plurality of pre-configured scenarios. Pre configured scenarios might include, but are not limited to theater, multiplex cinema, transportation terminal, sports event, school, medical clinic, building lobby and restaurant. Optionally, the wizard also offers a "create custom scenario" option. Optionally, the scenario creation wizard accepts a digital model of a space as an input and attempts to determine an appropriate scenario type.

In an exemplary embodiment of the invention, the scenario creation wizard asks how many simulated digital users are to be deployed in a simulation. Optionally, the scenario operator (e.g. design professional) is invited to divide the population into sub-populations and/or to define activities. In an exemplary embodiment of the invention, the scenario operator uses the interface to define the activities at least in terms of entry points and departure points from the digital model.

In an exemplary embodiment of the invention, each successive inputs entered via the wizard can be entered either as an independent variable and/or as a nested (hierarchical) variable with respect to one or more previously entered variables. In an exemplary embodiment of the invention, the inputs are in the form of attributes as described hereinabove (e.g. in the context of FIG. 5). Optionally, attributes are assigned to users and/or to objects.

According to various embodiments of the invention, user input interfaces can employ one or more input formats. Exemplary input formats include, but are not limited to, free text, pull down lists, sliders, radio buttons, checkboxes, palettes (e.g. color and/or texture) and up/down arrows. Optionally, inputs can be entered using one or more input devices (e.g. a keyboard, a mouse, a touch-screen, a stylus, and a microphone serving as an input for voice activated software).

Exemplary Environmental Factors

According to some exemplary embodiments of the invention, an environmental condition is defined in terms of one or more environmental factors. Environmental factors include, but are not limited to temperature, relative humidity, airflow, noise level, light level, sun/shadow areas, air pollutant level and noise type.

Exemplary Zones

According to various exemplary embodiments of the invention, environmental zones can serve as inputs and/or outputs. In some cases, a design professional can indicate a point and design a zone around the point based on a defined environmental condition. Optionally, a change in definition of environmental condition changes a size and/or shape of the zone.

In other cases, a design professional can manipulate a size and/or shape of an environmental zone. In these cases, output can be in the form of environmental condition belonging to the zone and/or in terms of a design input affecting the zone. For example, if a size of a "below 18 degrees centigrade" zone near an entrance is reduced, design inputs related to a heating and/or cooling system can be altered (e.g. number of cooling ducts reduced or flow from existing ducts is reduced).

In an exemplary embodiment of the invention, a design professional manipulates at least one object in the model as a means of manipulating at least one parameter of the zone. Optionally, the object is a visible object (e.g. a number of air conditioner vents and/or size of air conditioner vents) or an object which is not graphically represented in the model (e.g. airflow and/or air temperature of air supplied by air conditioner vents). Optionally, feedback to this manipulation is provided quickly, optionally substantially immediately. In an exemplary embodiment of the invention, quick feedback contributes to a design optimization process.

Exemplary Bubbles

In an exemplary embodiment of the invention, the model includes bubbles representing a space needed for a function to be performed by at least some members of the population. Optionally, bubbles are produced as part of simulation output or are input by a design professional. Bubbles can be represented graphically or remain hidden. Optionally, bubbles can be revealed by rolling a cursor over an area belonging to a bubble.

Exemplary Acoustic Considerations

In an exemplary embodiment of the invention, acoustic parameters influence and are influenced by other design elements and/or simulated digital users. This is in sharp contrast to previously available acoustic simulation applications which typically measure acoustic parameters per space (enclosed volume). Optionally, acoustic data is presented in terms of how it influences simulated digital users. For example, simulated digital users can change color in response to varying noise levels and/or noise types in a manner similar to that described hereinabove for temperature. In an exemplary embodiment of the invention, a single digital user engaged in an activity as part of a simulation changes colors in response to acoustic parameters which vary as the user moves through the model space.

In some cases, an "unacceptable" noise level may be permitted by a design professional if it influences simulated digital users only for a short time and/or affects only a small percentage of simulated digital users. For example, noise from truck engines may be deemed acceptable if it is audible at 80 dB, but only to simulated digital users that pass within 1.5 M of an opening for a conveyor belt that brings luggage into an arrival terminal. Since most users will not hear the noise, and those that do hear it will be expected to hear it only for a few seconds, it can be accepted. Similar considerations apply to environmental considerations, for example extreme temperatures and/or bright light.

Alternatively, or additionally, a nominally "acceptable" acoustic phenomenon can become a focus for design correction if it proves problematic. For example, a 25 dB hum from escalator motors might be deemed a problem if patrons in a café are subject to it during their entire stay.

In an exemplary embodiment of the invention, simulations consider internal acoustic gain in a manner similar to internal temperature gains. Optionally, a level and type of noise produced by each simulated digital user can vary according to the specific activity they perform and/or during performance of the activity. Optionally, acoustic production is inherent in a selected activity. In an exemplary embodiment of the invention, a design professional does not need to program acoustic production of users in order to produce a simulation which considers internal acoustic gains. Optionally or alternatively, similar functionality is provided for taking into account thermal internal gains.

In an exemplary embodiment of the invention, simulated digital users are set to be attracted or repulsed from certain acoustic conditions. For example, the sound of water jets in a decorative fountain may attract simulated digital users and/or cause them to pause near the fountain. Conversely, noise of trains can cause simulated digital users portraying arriving passengers to rapidly depart a train platform, even if items with attraction causative attributes (e.g. vending machines, rest rooms and drinking fountains) are provided on the platform. Simulated digital users portraying departing passengers are optionally not influenced by the noise of trains in the same way, because they need to be on the platform to board a train.

In an exemplary embodiment of the invention, acoustic conditions can be controlled by adjusting noise sources and/or altering distances between noise sources and simulated digital user and/or altering acoustic properties of objects in relevant areas of the model. Optionally, acoustic properties of objects are altered by changing construction materials.

In an exemplary embodiment of the invention, the system is designed to be modular in that new considerations can be added by plugging in. for example, if one day it becomes apparent that an environmental factor of "heat change per minute" is of interest, a module which calculates such a factor may be programmed and added. Optionally, the software architecture used includes a slot for inserting pointers to functions that calculate such external factors. Similarly, the data base used to store properties is optionally of a type which allows adding new attributes. Optionally, user menus and/or property boxes are calculated to include display area and fields according to the contents (e.g., available fields) in a database, for example, using UI methods known in the art.

Exemplary Integration

The above system may be implemented in various ways, for example, as a new software, as a plug-in to existing software (such as AUTOCAD, Maya, 3D Max, Rhino) and/or as an added module to such software. In a fully integrated system (e.g., add-on module or new software), a same database may be used for storing both existing software properties, such as color and novel properties, such as warmth. In a plug-in method, the plug-in optionally has its own database but has access to the database of the existing software.

In a new software, functionalities known for use in modeling software are optionally retained, and some or all additional functionalities as described herein optionally added. Optionally or alternatively, an existing modeling engine (e.g., for graphics) is used.

In an exemplary embodiment of the invention, menus are added for the new functions, for example, to a main menu and/or to context menus, as applicable (e.g., object properties are provided in context menu and execution of simulation modes in a main menu or sub-menus thereof). Dedicated control buttons may be added as well.

In an exemplary embodiment of the invention, the following functions (grouped by menus) are provided:

File handling:
Opening, saving files in a 2D/3D format.
Importing and exporting 2D/3D file formats to and from other applications
Viewing/display:
View models in a 3D space from different viewpoints
Navigate in a 3D space; pan, Zoom, rotate around objects.
View models in different shading modes (wire frame, shaded, with realistic materials)
General editing:
Clipboards actions (cut, paste, copy)
Selection capabilities: select objects components; select by type; create selection sets
Grouping and ungrouping entities
Measuring—get object's 2D, 3D dimension
Object creation:
2D—Draw lines, points, curves, and other geometrical 2 dimensional shapes
Surfaces—different creation methods for 2D surfaces in a 3D space
Volumes—create spheres, cubes and other 3 dimensional shapes
Joints—create hinges and pin joints
Lights—variety of artificial light features such as standard bulb, florescent etc with realistic attributes (these can affect environmental analysis output)
Actors—select actors from a library and place them in the model.
Materials: from a library, each material with its realistic attributes (may affect environmental analysis output)
Geometrical manipulations:
Transformation: move, scale, mirror etc—objects and or their components (points, edges)
Deformation: bend, squash, twist etc.
Editing geometry: merge, split, extrude objects and or their components
Environmental analysis:
Location—locate the 3D model in a specific latitude/longitude with its specific climatic data
Shadow/direct sunlight analysis—view shadow range, sun paths, direct sunlight patches and radiation levels
Daylight analysis—calculate daylight quantities
Thermal—calculate temperature and humidity levels in relation to climate and thermal conductivity of materials
Noise—Calculate noise levels from human activities, machinery traffic etc.
User related—receive information from the digital actor on its thermal and visual comfort levels.
User simulation:
Establishing affecting/affected relations between objects and digital users. (Digital users move through the 3D space responding to these relationships)
Types of affects can be: attract, repulse, change speed
Animation
Animation in time (Any change in the value of attributes)
Rendering
Creating realistically looking images of models through the calculation of light and material attributes used in the model Following is an exemplary list of Attributes for a 3D object, some or all of which attributes may be provided in some embodiments of the invention:

General:
Name: Name of object
Location: X,Y,Z word location
Dimensions: Width, Height, Depth, Area, Volume
Subdivision: Division along Width, Height & Depth
Visibility: on or off
Material:
Name, Color, Reflectivity, Transparency, Roughness, Solar absorption, Thermal decrement, Thermal lag, U-Value, Admittance, Emissivity
Environmental:
Shadows: cast and receive (yes or no), shadow color, shadow opacity.
Reflections: reflect light (yes or no), reflection color, reflection opacity
Comfort Zone Minimum & Maximum
Emission Attributes: Emit heat, air or noise (yes or no+values)
Simulation:
Status: on or off (determines if affecting digital users)
Gravity: on or off (determines if subject to gravity; various types of physics modeling methods may be used, ranging from none to high fidelity)
Affective (causative) attributes: none or one or more from: Attract, Repulse, Restrict location, Avoid Collision, Restrict amount, Follow, Meander, Seek, Change Speed, Delete, Count, Reset location, Change Color, Change Sensitivity, Pose.
Exemplary list of Attributes for a Digital User:
General: Name, Height, Age, Opacity, Visibility (on or off), Color
Environmental:
Shadows: cast and receive (yes or no), shadow color, shadow opacity.
Reflections: reflect light (yes or no), reflection color, reflection opacity
Comfort Zone Minimum & Maximum
Emission Attributes: Emit heat, or noise (yes or no+values)
Simulation:
Status: on or off (determines if affecting digital users)
Gravity: on or off (determines if subject to gravity)
Maximum Slope (determines degree of slope user can deal with)
Speed: default+maximum
Flock Behavior (determines if and how digital users flock responding to other users)
Collision Settings (determine how digital users calculate collision with their surroundings)
Vision Settings (various settings of virtual vision)
Visibility type (as user, path)
Affective (causative) attributes: none or one or more from: Attract, Repulse, Restrict location, Avoid Collision, Restrict amount, Follow, Meander, Seek, Change Speed, Delete, Count, Reset location, Change Color, Change Sensitivity, Pose.
General It is expected that during the life of this patent many relevant computer operating systems and/or computer assisted design (CAD) programs for engineering drawings will be developed and the scope of the invention is intended to include all such new technologies a priori.

As used herein the term "about" refers to ±10%.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Specifically, a variety of numerical indicators have been utilized. It should be understood that these numerical indicators could vary even further based upon a variety of engineering principles, materials, intended use and designs incorporated into the invention. Additionally, components and/or actions ascribed to exemplary embodiments of the invention and depicted as a single unit may be divided into subunits. Conversely, components and/or actions ascribed to exemplary embodiments of the invention and depicted as sub-units may be combined into a single unit with the described/depicted function.

Alternatively, or additionally, features used to describe a method can be used to characterize an apparatus and features used to describe an apparatus can be used to characterize a method.

It should be further understood that the individual features described hereinabove can be combined in all possible combinations and sub-combinations to produce exemplary embodiments of the invention. The examples given above are exemplary in nature and are not intended to limit the scope of the invention which is defined solely by the following claims. Specifically, the invention has been described in the context of building design but might also be used in landscape architecture and/or city planning.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

The terms "include", and "have" and their conjugates as used herein mean "including but not necessarily limited to".

The invention claimed is:

1. A computer implemented method of evaluating design space of architectural designs with regards to environmental and ergonomic factors, comprising:
providing in a computing system, a design model representing an architectural design of a physical space;
providing in said computing system, a model of user interaction with the architectural design;
proving in said computing system, a model of environmental conditions of the architectural design, the environmental conditions modeled as being affected by the architectural design and affected by user activities and affecting the user activities,
said environmental conditions being at least one of temperature, humidity, airflow, noise, lighting, shading and direct sun;
simulating using said computing system, activities of a plurality of users using said design model of the architectural design of said physical space;
simulating at least one of the environmental conditions affecting said plurality of users or affected by said plurality of users;
graphically animating a population of users engaged in various activities within the physical space,
scoring using a set of scoring functions, said architectural design based on results of said simulations;
evaluating said architectural design based on said scoring;
interactively varying and optimizing said design model of the architectural design based on said evaluating said architectural design; and
selecting a final architectural design of the physical space using the optimized design model of the architectural design.

2. The method according to claim 1, wherein said ergonomic factors are evaluated using a measure selected from a group consisting of a user occupancy density, a user performance with equipments and user velocity of motion, a population behavior, a user visibility, and an object visibility.

3. The method according to claim 1, wherein said environmental conditions include internal gain comprising one or more of heat produced or dissipated by occupants, appliances and lighting, and non-thermal parameters including humidity, carbon dioxide concentration, noise and lighting.

4. The method according to claim 1, wherein a population of users are modeled as pursuing goals, wherein the goals of the users change during simulation according to the architectural design of the physical space, other users using the physical space and environmental conditions present.

5. The method according to claim 4, wherein relative priority of goals change according to an occupancy status of a delineated area within the design model.

6. The method according to claim 4, wherein two different goals comprise goals in opposite motion directions.

7. The method according to claim 1, wherein the design model of the architectural design is scored using a usability score and a comfort score.

8. The method according to claim 7, wherein said usability score is measured based on number of users participating in activities, time spent in activities, money spent in activities, average waiting time in queues and variability of delays.

9. The method according to claim 7, wherein said comfort score is measured based on environmental conditions present in the architectural design of the physical space, physical crowding, visual crowding and time spent in looking for signs or a target of a goal.

10. The method according to claim 7, wherein a plurality of score functions are predefined and provided with the model of the user interaction so they can be selected during simulation and evaluation.

11. The method according to claim 7, wherein the scores are generated in real time during simulation and displayed on a user interface device as a function of simulation time, time of day and number of users using the architectural design of the physical space.

12. The method according to claim 7, wherein the scores are generated for a plurality of design models of the architectural design of the physical space and displayed on a user interface device side by side.

13. The method according to claim 12, wherein the plurality of design models of the architectural design is obtained by automatically varying one or more parameters of the design models within designer specified ranges of values.

14. The method according to claim 1, wherein a plurality of design models of the architectural design is evaluated for a plurality of non-emergency scenarios and a plurality of emergency scenarios.

15. The method according to claim 1, wherein at least some of the users have a non-emergency goal of performance of one or more time consuming activities before leaving the physical space.

16. The method according to claim 1, wherein simulation outputs are provided on a user interface device in a form of environmental conditions present in terms of temperature, humidity, airflow, noise, lighting, shading and direct sun.

17. The method according to claim 16, wherein the environmental conditions present in the architectural design of the physical space influence groups of users pursuing specific goals.

18. The method according to claim 16, wherein the environmental conditions present are graphically displayed with figures representing a population of users moving through the architectural design of the physical space.

19. The method according to claim 1, further comprising displaying the users in colors as functions of temperatures of the physical space through which they are moving, a red color representing high temperatures, a dark color representing a low temperatures and other colors representing other temperatures.

20. The method according to claim 1, wherein simulation output is displayed using bubbles and zones, wherein zones are defined in terms of level of attractiveness to the users based on environmental conditions present or visual properties of ability to see signs and queues.

21. The method according to claim 20, wherein a bubble represents space needed for performance of a certain activity and the bubble is created by defining a sum of all space occupied by the users performing the activity during the simulation.

22. The method according to claim 1, wherein said users whose activities are simulated are attracted to and repelled by environmental conditions present in the architectural design of the physical space.

23. The method according to claim 1, further comprising displaying on a user interface device simulated random behavior of groups of users in the architectural design of the physical space.

24. The method according to claim 23, wherein interactions of individuals with one another contributes to randomness of behavior of the population.

25. The method according to claim 1, wherein said computing system includes a user interface adapted to accept one or more changes to the design model and display how those changes influence simulated behavior of a population pursuing goals within design model.

26. The method according to claim 25, wherein said one or more changes to the design model are made to achieve desired architectural goals as indicated by the simulated behavior of the population.

27. The method according to claim 25, wherein said one or more changes to the design model impact size, location, shape and parameters of bubbles and zones.

28. The method according to claim 1, wherein the design model of the architectural design influences group behaviors including queue formation, queue identification, queue selection and waiting time.

29. The method according to claim 1, wherein the design model of the architectural design includes moveable objects and non-moveable objects with which users interact.

30. The method according to claim 1, wherein the model of user interaction includes users navigating via one or more signs in sequence to arrive at an intended destination.

31. The method according to claim 1, wherein properties of active objects in the design model of the architectural design are automatically selected to meet architectural requirements, the active objects comprising one or more of heat sources, light sources, noise sources, music sources' cooling sources and air flow sources.

32. The method according to claim 31, wherein behavior of the active objects in the design model of the architectural design are defined by scripts or state machines as functions of time, design parameters and environmental conditions.

33. The method according to claim 1, wherein simulating at least one of the environmental conditions comprises modifying user interactions according to the environmental conditions and modifying the environmental conditions according to user interactions.

34. The method according to claim 1, wherein simulating the activities of users includes simulating standing in queue by a plurality of users in a manner that interferes with one or both of movement and vision of other users.

35. The method according to claim 1, wherein simulation results are displayed on a user interface device as a statistic motion tracks and temporal behavior of users.

36. Apparatus for evaluating design space of architectural designs with regards to environmental and ergonomic factors, comprising:
a computing system with one or more processors;
a memory storing a program of instructions which when executed performs a process comprising:
providing a design model representing an architectural design of a physical space;
providing a model of user interaction with the architectural design;
proving a model of environmental conditions of the architectural design, the environmental conditions modeled as being determined by the architectural design and affected by user activities and affecting the user activities,
said environmental conditions being at least one of temperature, humidity, airflow, noise, lighting, shading and direct sun;
simulating activities of a plurality of users using said design model of the architectural design of said physical space;
simulating at least one of the environmental conditions affecting said plurality of users or affected by said plurality of users;
graphically animating a population of users engaged in various activities within the physical space,
scoring using a set of scoring functions, said architectural design based on results of said simulations;
evaluating said architectural design based on said scoring;
interactively varying and optimizing said design model of the architectural design based on said evaluating said architectural design; and
selecting a final architectural design of the physical space using the optimized design model of the architectural design.

37. A computer program product, comprising a non-transitory computer readable storage medium storing a computer executable program code which when executed on a computing system implements a method of evaluating design space of architectural designs with regards to environmental and ergonomic factors, comprising:

providing a design model representing an architectural design of a physical space;

providing a model of user interaction with the architectural design;

proving a model of environmental conditions of the architectural design, the environmental conditions modeled as being determined by the architectural design and affected by user activities and affecting the user activities, said environmental conditions being at least one of temperature, humidity, airflow, noise, lighting, shading and direct sun;

simulating activities of a plurality of users using said design model of the architectural design of said physical space;

simulating at least one of the environmental conditions affecting said plurality of users or affected by said plurality of users;

graphically animating a population of users engaged in various activities within the physical space, scoring using a set of scoring functions, said architectural design based on results of said simulations;

evaluating said architectural design based on said scoring;

interactively varying and optimizing said design model of the architectural design based on said evaluating said architectural design; and selecting a final architectural design of the physical space using the optimized design model of the architectural design.

38. A computer implemented method of evaluating design space of architectural designs with regards to environmental and ergonomic factors, comprising:

providing in a computing system, a design model representing an architectural design of a physical space;

providing in said computing system, a model of user interaction with the architectural design;

wherein a population of users are modeled as pursuing goals, wherein the goals of the users change during simulation according to the architectural design of the physical space, other users using the physical space and environmental conditions present; and relative priority of goals change according to an occupancy status of a delineated area within the design model;

proving in said computing system, a model of environmental conditions of the architectural design, the environmental conditions modeled as being determined by the architectural design and affected by user activities and affecting the user activities, said environmental conditions being at least one of temperature, humidity, airflow, noise, lighting, shading and direct sun;

simulating using said computing system, activities of a plurality of users using said design model of the architectural design of said physical space;

simulating at least one of the environmental conditions affecting said plurality of users or affected by said plurality of users;

scoring using a set of scoring functions, said architectural design based on results of said simulations;

evaluating said architectural design based on said scoring;

interactively varying and optimizing said design model of the architectural design based on said evaluating said architectural design; and selecting a final architectural design of the physical space using the optimized design model of the architectural design.

39. Apparatus for evaluating design space of architectural designs with regards to environmental and ergonomic factors, comprising:

a computing system with one or more processors;

a memory storing a program of instructions which when executed performs a process comprising:

providing a design model representing an architectural design of a physical space;

providing a model of user interaction with the architectural design;

wherein a population of users are modeled as pursuing goals, wherein the goals of the users change during simulation according to the architectural design of the physical space, other users using the physical space and environmental conditions present; and relative priority of goals change according to an occupancy status of a delineated area within the design model;

proving a model of environmental conditions of the architectural design, the environmental conditions modeled as being determined by the architectural design and affected by user activities and affecting the user activities, said environmental conditions being at least one of temperature, humidity, airflow, noise, lighting, shading and direct sun;

simulating activities of a plurality of users using said design model of the architectural design of said physical space;

simulating at least one of the environmental conditions affecting said plurality of users or affected by said plurality of users;

scoring using a set of scoring functions, said architectural design based on results of said simulations;

evaluating said architectural design based on said scoring;

interactively varying and optimizing said design model of the architectural design based on said evaluating said architectural design; and selecting a final architectural design of the physical space using the optimized design model of the architectural design.

40. A computer program product, comprising a computer readable storage medium storing a computer executable program code which when executed on a computing system implements a method of evaluating design space of architectural designs with regards to environmental and ergonomic factors, comprising:

providing a design model representing an architectural design of a physical space;

providing a model of user interaction with the architectural design;

wherein a population of users are modeled as pursuing goals, wherein the goals of the users change during simulation according to the architectural design of the physical space, other users using the physical space and environmental conditions present; and relative priority of goals change according to an occupancy status of a delineated area within the design model;

proving a model of environmental conditions of the architectural design, the environmental conditions modeled as being determined by the architectural design and affected by user activities and affecting the user activities, said environmental conditions being at least one of temperature, humidity, airflow, noise, lighting, shading and direct sun;
simulating activities of a plurality of users using said design model of the architectural design of said physical space;
simulating at least one of the environmental conditions affecting said plurality of users or affected by said plurality of users;
scoring using a set of scoring functions, said architectural design based on results of said simulations;
evaluating said architectural design based on said scoring;
interactively varying and optimizing said design model of the architectural design based on said evaluating said architectural design; and
selecting a final architectural design of the physical space using the optimized design model of the architectural design.

* * * * *